United States Patent
Ishak et al.

(10) Patent No.: US 9,798,163 B2
(45) Date of Patent: Oct. 24, 2017

(54) SELECTIVE WAVELENGTH FILTERING WITH REDUCED OVERALL LIGHT TRANSMISSION

(71) Applicant: High Performance Optics, Inc., Roanoke, VA (US)

(72) Inventors: Andrew Ishak, Havre de Grace, MD (US); Ronald Blum, Roanoke, VA (US); Anita Trajkovska-Broach, Christiansburg, VA (US)

(73) Assignee: High Performance Optics, Inc., Roanoke, VA (US)

(*) Notice: Subject to any disclaimer, the term of this patent is extended or adjusted under 35 U.S.C. 154(b) by 0 days.

(21) Appl. No.: 14/709,523

(22) Filed: May 12, 2015

(65) Prior Publication Data

US 2015/0323812 A1    Nov. 12, 2015

Related U.S. Application Data

(60) Provisional application No. 61/991,721, filed on May 12, 2014.

(51) Int. Cl.
*G02C 7/10* (2006.01)
*G02B 1/11* (2015.01)
(Continued)

(52) U.S. Cl.
CPC ............... *G02C 7/104* (2013.01); *G02B 1/11* (2013.01); *G02B 5/20* (2013.01); *G02B 5/208* (2013.01);
(Continued)

(58) Field of Classification Search
CPC .......... G02C 7/10; G02C 7/104; G02C 7/105; G02C 7/108; G02B 1/11; G02B 5/20; G02B 5/22; G02B 5/208
(Continued)

(56) References Cited

U.S. PATENT DOCUMENTS 3,269,267 A    8/1966 Collins
3,687,863 A    8/1972 Wacher
(Continued)

FOREIGN PATENT DOCUMENTS

CN    1659235 A    8/2005
CN    1961041 A    5/2007
(Continued)

OTHER PUBLICATIONS

Baumeister, P. & Pincus, G, "Optical Interference Coatings," *Scientific American*, 1970.
(Continued)

*Primary Examiner* — Jordan Schwartz
(74) *Attorney, Agent, or Firm* — Sterne, Kessler, Goldstein & Fox P.L.L.C.

(57) ABSTRACT

A system is provided that selectively blocks blue light in addition to having low overall transmittance values. The average value of the transmission spectrum of the system across the wavelength range 400 nm-470 nm is between 0% and 30% and the average value of the transmission spectrum across the wavelength range 470 nm-700 nm is between 0% and 70%. The transmission spectrum of the system has a first local minimum in transmission between 400 nm-470 nm.

16 Claims, 12 Drawing Sheets

(51) Int. Cl.
*G02B 5/20* (2006.01)
*G02B 1/14* (2015.01)

(52) U.S. Cl.
CPC ............... *G02C 7/10* (2013.01); *G02C 7/108* (2013.01); *G02B 1/14* (2015.01)

(58) Field of Classification Search
USPC ........ 351/44, 159.49, 159.59, 159.6, 159.63, 351/159.65
See application file for complete search history.

(56) References Cited

U.S. PATENT DOCUMENTS

| | | |
|---|---|---|
| 4,017,292 A | 4/1977 | Mann |
| 4,043,637 A | 8/1977 | Hovey |
| 4,247,177 A | 1/1981 | Marks et al. |
| 4,390,676 A | 6/1983 | Loshaek |
| 4,581,288 A | 4/1986 | Barnhart et al. |
| 4,656,186 A | 4/1987 | Bommer et al. |
| 4,679,918 A | 7/1987 | Ace |
| 4,698,374 A | 10/1987 | Gallas |
| 4,793,669 A | 12/1988 | Perilloux |
| 4,826,286 A | 5/1989 | Thornton |
| 4,878,748 A | 11/1989 | Johansen et al. |
| 4,952,046 A | 8/1990 | Stephens et al. |
| 5,054,902 A | 10/1991 | King |
| 5,172,256 A | 12/1992 | Sethofer et al. |
| 5,177,509 A | 1/1993 | Johansen et al. |
| 5,235,358 A | 8/1993 | Mutzhas et al. |
| 5,373,515 A | 12/1994 | Wakabayashi et al. |
| 5,374,663 A | 12/1994 | Daicho et al. |
| 5,381,193 A * | 1/1995 | Wedding ................ G02C 7/102 351/159.63 |
| 5,400,175 A | 3/1995 | Johansen et al. |
| 5,470,932 A | 11/1995 | Jinkerson |
| 5,521,765 A | 5/1996 | Wolfe |
| 5,528,322 A | 6/1996 | Jinkerson |
| 5,534,041 A | 7/1996 | Havens et al. |
| 5,543,504 A | 8/1996 | Jinkerson |
| 5,617,154 A | 4/1997 | Hoffman |
| 5,662,707 A | 9/1997 | Jinkerson |
| 5,694,240 A | 12/1997 | Sternbergh |
| 5,702,819 A | 12/1997 | Gupta et al. |
| 5,729,379 A | 3/1998 | Allemand et al. |
| 6,021,001 A | 2/2000 | Turner |
| 6,102,539 A | 8/2000 | Tucker |
| 6,132,044 A * | 10/2000 | Sternbergh ............ G02C 7/104 351/159.65 |
| 6,145,984 A | 11/2000 | FarWig |
| 6,158,862 A | 12/2000 | Patel et al. |
| 6,220,703 B1 | 4/2001 | Evans et al. |
| 6,231,183 B1 | 5/2001 | Dillon |
| 6,277,940 B1 | 8/2001 | Niwa et al. |
| 6,305,801 B1 | 10/2001 | Kerns et al. |
| 6,306,316 B1 | 10/2001 | Mann et al. |
| 6,310,215 B1 | 10/2001 | Iwamoto |
| 6,326,448 B1 | 12/2001 | Ojio et al. |
| 6,334,680 B1 * | 1/2002 | Larson ................... G02C 7/108 351/159.56 |
| 6,373,615 B1 | 4/2002 | Mann et al. |
| 6,411,450 B1 | 6/2002 | Gatewood et al. |
| 6,444,146 B2 | 9/2002 | Yoshimura et al. |
| 6,554,424 B1 | 4/2003 | Miller et al. |
| 6,604,824 B2 | 8/2003 | Larson |
| 6,612,697 B1 * | 9/2003 | Aurelius ................ G02B 5/226 351/159.62 |
| 6,641,261 B2 | 11/2003 | Wang et al. |
| 6,726,320 B1 * | 4/2004 | Mullin .................... G02C 7/10 351/159.64 |
| 6,793,339 B1 | 9/2004 | Yip et al. |
| 6,851,074 B2 | 2/2005 | Miloiicic et al. |
| 6,863,848 B2 | 3/2005 | Engardio et al. |
| 6,918,931 B2 | 7/2005 | Lai et al. |
| 6,926,405 B2 | 8/2005 | Ambler et al. |
| 6,955,430 B2 | 10/2005 | Pratt |
| 6,960,231 B2 | 11/2005 | Tran |
| 6,972,034 B2 | 12/2005 | Tran et al. |
| 6,984,038 B2 | 1/2006 | Ishak |
| 6,984,734 B2 | 1/2006 | Sessler et al. |
| 6,986,579 B2 | 1/2006 | Blum et al. |
| 7,029,118 B2 | 4/2006 | Ishak |
| 7,029,758 B2 | 4/2006 | Gallas et al. |
| 7,033,391 B2 | 4/2006 | Lai et al. |
| 7,066,596 B2 | 6/2006 | Ishak |
| 7,098,283 B2 | 8/2006 | Lai |
| 7,166,357 B2 | 1/2007 | Kumar et al. |
| 7,241,312 B2 | 7/2007 | Lai et al. |
| 7,255,435 B2 | 8/2007 | Pratt |
| 7,271,298 B2 | 9/2007 | Xu et al. |
| 7,275,822 B2 | 10/2007 | Gupta et al. |
| 7,276,544 B2 | 10/2007 | Lai et al. |
| 7,278,737 B2 | 10/2007 | Mainster et al. |
| 7,279,538 B2 | 10/2007 | Lai et al. |
| 7,304,117 B2 | 12/2007 | Lai |
| 7,364,291 B2 | 4/2008 | Haywood et al. |
| 7,506,977 B1 * | 3/2009 | Aiiso ..................... C09B 47/04 351/159.63 |
| 7,520,608 B2 | 4/2009 | Ishak et al. |
| 7,524,060 B2 | 4/2009 | Sanchez Ramos |
| 7,556,376 B2 | 7/2009 | Ishak et al. |
| 7,713,452 B2 | 5/2010 | Kauffman et al. |
| 7,832,903 B2 | 11/2010 | Sanchez Ramos |
| 7,914,177 B2 | 3/2011 | Sanchez Ramos |
| 8,113,651 B2 | 2/2012 | Blum |
| 8,360,574 B2 | 1/2013 | Ishak et al. |
| 2002/0042653 A1 | 4/2002 | Copeland et al. |
| 2002/0118431 A1 | 8/2002 | Sommer et al. |
| 2002/0126256 A1 | 9/2002 | Larson |
| 2002/0159026 A1 | 10/2002 | Bernheim |
| 2003/0076474 A1 | 4/2003 | Wang et al. |
| 2003/0105130 A1 | 6/2003 | Hurley et al. |
| 2003/0193643 A1 | 10/2003 | Pratt |
| 2003/0229131 A1 | 12/2003 | Sessler et al. |
| 2004/0014737 A1 | 1/2004 | Vincente et al. |
| 2004/0041287 A1 | 3/2004 | Engardio et al. |
| 2004/0070726 A1 | 4/2004 | Ishak |
| 2004/0084790 A1 | 5/2004 | Blum et al. |
| 2004/0185268 A1 | 9/2004 | Kumar et al. |
| 2004/0246437 A1 | 12/2004 | Ambler et al. |
| 2005/0018131 A1 | 1/2005 | Ishak |
| 2005/0043793 A1 | 2/2005 | Pratt |
| 2005/0054797 A1 | 3/2005 | Lai |
| 2005/0055090 A1 | 3/2005 | Lai |
| 2005/0055091 A1 | 3/2005 | Lai |
| 2005/0090428 A1 | 4/2005 | Compans et al. |
| 2005/0143812 A1 | 6/2005 | Paul et al. |
| 2005/0243272 A1 | 11/2005 | Mainster et al. |
| 2005/0248752 A1 | 11/2005 | Hall |
| 2005/0254003 A1 | 11/2005 | Jani et al. |
| 2005/0273163 A1 | 12/2005 | Tran et al. |
| 2005/0283234 A1 | 12/2005 | Zhou et al. |
| 2006/0020337 A1 | 1/2006 | Lai et al. |
| 2006/0020338 A1 | 1/2006 | Lai |
| 2006/0092374 A1 | 5/2006 | Ishak |
| 2006/0099148 A1 | 5/2006 | Fisher et al. |
| 2006/0119954 A1 | 6/2006 | Casper et al. |
| 2006/0126019 A1 | 6/2006 | Liang et al. |
| 2006/0146280 A1 | 7/2006 | Gupta et al. |
| 2006/0197067 A1 | 9/2006 | Xia et al. |
| 2006/0228725 A1 | 10/2006 | Salafsky |
| 2006/0235428 A1 | 10/2006 | Silvestrini |
| 2006/0241263 A1 | 10/2006 | Lai |
| 2006/0252844 A1 | 11/2006 | Mentak |
| 2007/0034833 A1 | 2/2007 | Parce et al. |
| 2007/0035240 A1 | 2/2007 | Yang et al. |
| 2007/0092831 A1 | 4/2007 | Lai et al. |
| 2007/0159594 A9 | 7/2007 | Jani et al. |
| 2007/0171537 A1 * | 7/2007 | Fung ........................ G02C 7/12 359/642 |
| 2007/0188701 A1 | 8/2007 | Sanchez Ramos |
| 2007/0195262 A1 | 8/2007 | Mosse et al. |
| 2007/0216861 A1 | 9/2007 | Ishak et al. |
| 2007/0293666 A1 | 12/2007 | Minami et al. |

(56) References Cited

U.S. PATENT DOCUMENTS

| | | |
|---|---|---|
| 2008/0002147 A1 | 1/2008 | Haywood et al. |
| 2008/0013035 A1 | 1/2008 | Yang et al. |
| 2008/0013045 A1 | 1/2008 | Mainster et al. |
| 2008/0043200 A1 | 2/2008 | Ishak et al. |
| 2008/0094566 A1 | 4/2008 | Ishak et al. |
| 2008/0186448 A1 | 8/2008 | Ishak et al. |
| 2008/0221674 A1 | 9/2008 | Blum et al. |
| 2008/0241951 A1 | 10/2008 | Battulga et al. |
| 2008/0291394 A1* | 11/2008 | Ishak .............. G02C 7/12 351/159.6 |
| 2008/0297931 A1 | 12/2008 | Sanchez Ramos |
| 2009/0247483 A1 | 10/2009 | Mitchell et al. |
| 2009/0268157 A1 | 10/2009 | Krieg-Kowald et al. |
| 2010/0004330 A1 | 1/2010 | Huang et al. |
| 2010/0007847 A1 | 1/2010 | Cano et al. |
| 2010/0053550 A1 | 3/2010 | Giraudet |
| 2010/0060850 A1 | 3/2010 | Giraudet |
| 2010/0066974 A1 | 3/2010 | Croft et al. |
| 2010/0085534 A1 | 4/2010 | Mainster |
| 2010/0091240 A1 | 4/2010 | Drobe et al. |
| 2010/0125136 A1 | 5/2010 | Yeh et al. |
| 2011/0075096 A1 | 3/2011 | Ishak et al. |
| 2011/0141432 A1* | 6/2011 | Nesty .............. G02C 7/105 351/44 |
| 2011/0157546 A1 | 6/2011 | Ishak et al. |
| 2012/0075577 A1 | 3/2012 | Ishak et al. |
| 2012/0120515 A1 | 5/2012 | Ishak et al. |
| 2013/0271725 A1* | 10/2013 | Chiou .............. G02C 7/12 351/159.56 |
| 2016/0320636 A1* | 11/2016 | Baillet .............. G02C 7/104 |

FOREIGN PATENT DOCUMENTS

| | | |
|---|---|---|
| DE | 3544627 | 12/1985 |
| EP | 0763754 A2 | 3/1997 |
| EP | 1837698 A1 | 9/2007 |
| JP | H07-113710 | 7/1988 |
| JP | H01-204668 | 8/1989 |
| JP | H02-103504 | 4/1990 |
| JP | H06-324293 | 11/1994 |
| JP | H07-306387 | 11/1995 |
| JP | H08-254603 | 1/1996 |
| JP | H09-136902 | 5/1997 |
| JP | H09-187500 | 7/1997 |
| JP | H10-186291 | 7/1998 |
| JP | H11-52101 | 2/1999 |
| JP | H11-101901 | 4/1999 |
| JP | 2000-147201 | 5/2000 |
| JP | 2001-506012 | 5/2001 |
| JP | 2001-517324 | 10/2001 |
| JP | 2002-031701 A | 1/2002 |
| JP | 2002-530686 | 9/2002 |
| JP | 2003-215302 A | 7/2003 |
| JP | 2004-524558 | 8/2004 |
| JP | 2004-247156 A | 9/2004 |
| JP | 2005-261606 | 9/2005 |
| JP | 2006-91532 A | 4/2006 |
| JP | 2006-184596 | 7/2006 |
| JP | 2006-265408 | 10/2006 |
| JP | 2006-265532 | 10/2006 |
| JP | 2006-273717 | 10/2006 |
| JP | 2006-527397 A | 11/2006 |
| JP | 2007-535708 A | 12/2007 |
| JP | 2009-531719 A | 9/2009 |
| JP | 2010-511205 | 4/2010 |
| WO | WO 88/02871 | 4/1988 |
| WO | WO 98/44380 | 10/1998 |
| WO | WO 2005/001554 A1 | 1/2005 |
| WO | WO 2005/116138 A1 | 8/2005 |
| WO | WO 2005/111702 | 11/2005 |
| WO | WO 2007/109202 A2 | 9/2007 |
| WO | WO 2007/120427 A1 | 10/2007 |
| WO | WO 2007/146933 A2 | 12/2007 |
| WO | WO 2008/024414 A2 | 2/2008 |
| WO | WO 2008/059177 | 5/2008 |
| WO | WO 2008/067109 A1 | 6/2008 |
| WO | WO 2008/106449 | 9/2008 |
| WO | WO 2009/053502 | 4/2009 |
| WO | WO 2010/111499 A1 | 9/2010 |
| WO | WO 2013/084178 | 6/2013 |

OTHER PUBLICATIONS

*CRC Handbook of Chemistry and Physics*, 85th Ed., 2004-2005, pp. 10-217.

Ernest, "Light-transmission-spectrum comparison of foldable intraocular lenses," *J. Cataract Refract Surg.*, vol. 30, 2004, p. 1755-1758.

Espindle et al., "Quality-of-life improvements in cataract patients with bilateral blue light-filtering intraocular lenses: Clinical trial" *J. Cataract Refract Surg.*, vol. 31, Oct. 2005, p. 1952-1959.

Infeld, K."Sunlight Poses Universal Cataract Risk" Johns Hopkins Study (1998) available at http://www.eurekalert.org/releases/jhu-sunposcat.html, last visited Feb. 1, 2008.

International Search Report and Written Opinion dated Aug. 26, 2008, dated in International Patent Application No. PCT/US07/06748, filed Mar. 19, 2007.

International Search Report and Written Opinion dated Dec. 16, 2008, dated in International Patent Application No. PCT/US07/70995, filed Jun. 12, 2007.

International Search Report and Written Opinion dated Jul. 16, 2008, dated in International Patent Application No. PCT/US07/18593, filed Aug. 23, 2007.

International Search Report and Written Opinion dated May 28, 2009, dated in International Patent Application No. PCT/US07/83236, filed Oct. 31, 2007.

International Search Report and Written Opinion dated Sep. 25, 2011, dated in International Patent Application No. PCT/US10/28680, filed Mar. 25, 2010.

International Search Report and Written Opinion, dated Jul. 25, 2008, for International Patent Application No. PCT/US08/55017, filed Feb. 26, 2008.

International Search Report and Written Opinion, dated Nov. 15, 2011, for International Patent Application No. PCT/US2011/42922, filed Jul. 5, 2011.

Johnson, J.E., "A Study of Qunizarin (Orange Dye 2) in Hexane as a Model Fuel Dye", accessed at http://ww.labmate-online.com/article_read/1005/, accessed on Jun. 10, 2014, published May 12, 2011.

Johnson, W. & Crane, R. "Color Neutral Rugate Filter", SPIE, vol. 2046, pp. 132-140 (Nov. 1993).

Johnson, W. & Crane, R. "Introduction to Rugate Filter Technology" SPIE 2046: 88-108 (Nov. 1993).

Kalloniatis, M. & Luu, C. "Psychophysics of Vision" available at http://webvision.med.utah.edu/Phych1.html, last visited Jan. 29, 2008.

Leibovitch et al., "Visual outcomes with the yellow intraocular lens," *ACTA Opthalmologica Scandinavica* 2006, vol. 84, p. 95-99.

Li, Q. et al., "The effect of blue light on visual function," *International Review of Ophthalmology*, vol. 30, No. 5, Oct. 2006, p. 336-340.

Mainster, M.A. & Sparrow, J.R. "How Much Blue Light Should an IOL Transmit?" British Journal of Ophthalmology, 2003, vol. 87, pp. 1523-1529.

Mainster, M.A., "Intraocular Lenses Should Block UV Radiation and Violet but not Blue Light" *Arch. Ophthal.*, 2005, vol. 123, pp. 550.

Mainster, M.A., "Violet and Blue Light Blocking Intraocular Lenses: Photoprotection vs. Photoreception," *Br J Ophthalmol*, 2006, vol. 90, pp. 784-792.

McLeod, A., *Thin Film Optical Filters*, pp. 86-347, McGraw-Hill, New York (1989).

Moon and Spencer, "A Metric for Colorspace", J. Opt. Soc. Am., vol. 33, No. 5, pp. 260-269 (1944).

NACL website, as archived from Oct. 8, 2000: http://web.archive.org/web/20001008003354//www .nacl.com/custom.htm obtained for WayBack Machine at www.archive.org.

(56) References Cited

OTHER PUBLICATIONS

Nolan, J.M. et al., "Augmentation of Macular Pigment following Implantation of Blue Light-Filtering Intraocular Lenses at the Time of Cataract Surgery" *Invest Ophthalmol Vis Sci*, 2009, vol. 50(10), pp. 4777-4785.
Notice of Reexamination dated May 23, 2014 in Chinese Application No. 20078001759.0.
Notice of Reexamination dated Sep. 23, 2014 in Chinese Application No. 20078001759.0.
Office Action dated Apr. 14, 2014, issued in Canadian Application No. 2,661,465.
Office Action dated Apr. 15, 2013, issued in Chinese Patent Application No. 201080022639.X, filed Mar. 25, 2010.
Office Action dated Apr. 28, 2014, issued in Korean Application No. 9-5-2014-028970883.
Office Action dated Aug. 20, 2013, issued in Japanese Application No. 2013-140659, filed Jul. 4, 2013.
Office Action dated Aug. 21, 2014, issued in European Patent Application No. 07844774.5.
Office Action dated Dec. 13, 2011, issued in Chinese Application No. 20078001759.0.
Office Action dated Dec. 21, 2012, issued in Japanese Patent Application No. 2009-539390.
Office Action dated Dec. 27, 2013, issued in Chinese Patent Application No. 201080022639.X, filed Mar. 25 2010.
Office Action dated Dec. 3, 2012, in Chinese Patent Application No. 200780050536.2, High Performance Optics, Inc., filed Oct. 31, 2007.
Office Action dated Feb. 1, 2013, issued in Japanese Patent Application No. 2009-515603.
Office Action dated Feb. 10 2015, issued in U.S. Appl. No. 12/731,215.
Office Action dated Feb. 17, 2012, for Chinese application No. 200780050536.2.
Office Action dated Feb. 18 2015, issued in U.S. Appl. No. 13/014,483.
Office Action dated Feb. 27, 2015 dated in Australian Application No. 2010229849.
Office Action dated Feb. 5, 2013, for Japanese Application No. 2009-501478, filed Mar. 19, 2007.
Office Action dated Feb. 7, 2013, issued in Israeli Application No. 194226.
Office Action dated Jan. 20, 2014, issued in Canadian Application No. 2,655,130.
Office Action dated Jan. 20, 2015, issued in Canadian Application No. 2,670,789.
Office Action dated Jan. 22, 2015, issued in Korean Application No. 10-2008-7030594.
Office Action dated Jan. 22, 2015, issued in Korean Application No. 10-2014-7030168.
Office Action dated Jan. 23, 2014, issued in Singaporean Application No. 201106973-9.
Office Action dated Jan. 28, 2014, issued in Japanese Patent Application No. 2012-502251, filed Mar. 25, 2010.
Office Action dated Jan. 3, 2014, issued in Chinese Patent Application No. 200780050536.2, filed Oct. 31, 2007.
Office Action dated Jan. 5, 2012, issued in Australian Application No. 2007227389.
Office Action dated Jan. 6, 2014, issued in Canadian Application No. 2,645,742.
Office Action dated Jul. 1, 2014, issued in Chinese Patent Application No. 200780050536.2, filed Oct. 31, 2007.
Office Action dated Jul. 12, 2010, issued in Chinese Patent Application No. 200780050536.2, filed Oct. 31, 2007.
Office Action dated Jul. 18, 2012, issued in Japanese Patent Application No. 2009-515603.
Office Action dated Jul. 25, 2013, issued in Japanese Application No. 2009-539390, filed Oct. 31, 2007.
Office Action dated Jul. 26, 2012, issued in Australian Patent Application No. 2007325483.
Office Action dated Jul. 29, 2013, issued in Korean Application No. 9-5-2013-051987493.
Office Action dated Jul. 31, 2014, issued in Canadian Application No. 2,645,742.
Office Action dated Jun. 20, 2014, issued in Japanese Application. No. 2009-501478, filed Mar. 19, 2007.
Office Action dated Mar. 17, 2014, issued in Japanese Patent Application No. 2013-140659.
Office Action dated Mar. 23, 2015, issued in Japanese Application No. 2013-123522.
Office Action dated Mar. 30, 2015, issued in Japanese Application No. 2014-147092.
Office Action dated May 12, 2014, issued in Israeli Patent Application No. 197167.
Office Action dated May 13, 2014, issued in Japanese Application No. 2013-139471.
Office Action dated May 8, 2014, issued in Canadian Application No. 2,670,789, filed Oct. 31, 2007.
Office Action dated May 9, 2013, issued in Korean National Phase Application No. 10-2008-7023304.
Office Action dated May 9, 2014, issued in Japanese Patent Application No. 2013-123522.
Office Action dated Nov. 18, 2013, issued in Korean Application No. 10-2009-70063705.
Office Action dated Oct. 31, 2014, issued in Japanese Application No. 2013-140659.
Office Action dated Sep. 16, 2014, issued in Japanese Application No. 2012-502251.
Office Action dated Sep. 18, 2013, issued in Japanese Application No. 2009-501478, filed Mar. 19, 2007.
Office Action dated Sep. 25, 2012, issued in Australian Patent Application No. 2007257752.
Office Action dated Apr. 21, 2015, issued in Japanese Application No. 2013-139471.
Office Action dated Nov. 17, 2015, issued in Japanese Application No. 2015-006193, filed Mar. 25, 2010.
Patent Examination Search Report No. 1 for Australian Patent Application No. 2010229849, dated Mar. 18, 2014.
Reexamination Decision dated Sep. 25, 2014, dated in Chinese Application No. 200780017579.0.
Rodriguez-Galietero et al., "Comparison of contrast sensitivity and color discrimination after clear and yellow intraocular lens implantation" *J. Cataract Refract Surg.*, vol. 31, Sep. 2005, p. 1736-1740.
Sparrow, J.R. et al., "Blue light-absorbing intraocular lens and retinal pigment epithelium protection in vitro," *J. Cataract Refract. Surg.* 2004, vol. 30, pp. 873-878.
Supplementary search report for EP Application No. 07844774.5, dated Mar. 2, 2010.
Supplementary search report for EP Application No. 10756850.3, dated Jun. 17, 2014.
Ueda, T. et al., "Eye damage control by reduced blue illumination," *Exp Eye Res.*, 2009, vol. 89(6), pp, 863-868.
Willard et al., *Instrumental Methods of Analysis*, 6th Ed., pp. 67-68 (1981).
Wyszecki & Stiles. *Color Science: Concepts and Methods, Quantitative Data and Formulae*, pp. 100-107, Wiley, New York (1982).
International Search Report and Written Opinion dated Jul. 22, 2015, for International Application No. PCT/US 15/29073, High Performance Optics, Inc., filed May 4, 2015.
Samaroo et al. Efficient microwave-assisted synthesis of amine substituted pentafluorophenylporphyrin in Org Lett. Oct. 26, 2006; vol. 8(22): pp. 4985-4988. Abstract.
Office Action dated Jul. 24, 2015, in Canadian Patent Application No. 2,670,789, High Performance Optics, Inc., filed Oct. 31, 2007.
Office Action dated Jul. 24, 2015, in Indian Patent Application No. 5247/CHENP/2008, High Performance Optics, Inc., filed Sep. 30, 2008.
Office Action dated Aug. 27, 2015, in Chinese Patent Application. No. 201410641454.7, High Performance Optics, Inc., filed Mar. 25, 2010.
Search Report dated Aug. 27, 2015, for Chinese Patent Application No. 201410641454.7, High Performance Optics, Inc., filed Mar. 25, 2010.

(56) References Cited

OTHER PUBLICATIONS

Office Action dated Sep. 14, 2015, in Japanese Patent Application No. 2013-140659, High Performance Optics, Inc., filed Apr. 7, 2013.
Office Action mailed Oct. 5, 2015, in Japanese Patent Application No. 2009-501478, High Performance Optics, Inc., filed Mar. 19, 2007.
Zhou, Jilin and Sparrow, Janet R., "Light Filtering in Retinal Pigment Epithelial Cell Culture Model," *Optometry and Vision Science*, 88(6), 2011, pp. 1-7.

* cited by examiner

SELECTIVE WAVELENGTH FILTERING WITH REDUCED OVERALL LIGHT TRANSMISSION

CROSS-REFERENCE TO RELATED APPLICATIONS

The present application claims benefit to U.S. Provisional Application No. 61/991,721, filed on May 12, 2014, which is related to U.S. Provisional Application No. 61/819,599, filed on May 5, 2013. The contents of these applications are expressly incorporated herein by reference in their entireties. Additionally, the following applications and patents are related to the application herein: U.S. Pat. Nos. 7,556,376; 7,520,608; 8,360, 574; 8,403,478; Ser. Nos. 13/770,517; 12/080,806; U.S. Pat. Nos. 7,066,596; 6,984,038; 7,029,118.

BACKGROUND

Field of the Invention

The present invention relates to systems having low overall light transmission in addition to enhanced blocking of selective wavelengths.

Background Art

Electromagnetic radiation from the sun continuously bombards the Earth's atmosphere. Light is made up of electromagnetic radiation that travels in waves. The electromagnetic spectrum includes radio waves, millimeter waves, microwaves, infrared, visible light, ultra-violet (UVA and UVB), x-rays, and gamma rays. The visible light spectrum includes the longest visible light wavelength of approximately 700 nm and the shortest of approximately 400 nm (nanometers or 10-9 meters).

BRIEF SUMMARY

In one embodiment, an ophthalmic system has an ophthalmic lens. The average value of the transmission spectrum of the system across the wavelength range 400 nm-470 nm is between 0% and 30%. The average value of the transmission spectrum of the system across the wavelength range 470 nm-700 nm is between 0% and 70%. The transmission spectrum of the system has a first local minimum in transmission at a first wavelength in the wavelength range 400 nm-470 nm. In one embodiment, the average value of the transmission spectrum of the system across the wavelength range 400 nm-470 nm is between 5% and 30% and the average value of the transmission spectrum of the system across the wavelength range 470 nm-700 nm is between 20% and 70%.

In one embodiment, the transmission spectrum of the system at every wavelength across the wavelength range 400 nm to 470 nm is between 5% and 30%. In one embodiment, the transmission spectrum of the system at every wavelength across the wavelength range 470 nm to 700 nm is between 20% and 70%.

In one embodiment, the average value of the transmission spectrum of the system across the wavelength range 470 nm to 700 nm is between 8% and 40%.

In one embodiment, for least one point within 10 nm of the first wavelength on the positive side, the slope of the transmission spectrum of the system is at least 0.5% transmittance per nm. In one embodiment, for at least one point within 10 nm of the first wavelength on the negative side, the slope of the transmission spectrum of the system is negative and has an absolute value of at least 0.5% transmittance per nm.

In one embodiment, at the first wavelength, the system transmits between 0.1% and 15%. In one embodiment, at the first wavelength, the system transmits between 5% and 15%.

In one embodiment, the first wavelength is within the range 425 nm to 445 nm. In one embodiment, the first wavelength is within the range 405 nm to 455 nm. In one embodiment, the first wavelength is within the range 405 nm to 465 nm. In one embodiment, the first wavelength is within the range 440 nm to 470 nm.

In one embodiment, the transmission spectrum of the system has only one local minimum within the wavelength range 400 nm to 470 nm.

In one embodiment, the transmission spectrum of the system has a first average transmission near the first wavelength. The first average transmission is defined as the integral of the transmission spectrum between 5 nm below the first wavelength to 5 nm above the first wavelength, divided by 10 nm. The transmission spectrum of the system has a second average transmission in the blue region excluding wavelength range used to calculate the first average transmission. The second average transmission is defined as the integral of the transmission spectrum between 400 and 470 nm minus the integral of the transmission spectrum between 5 nm below the first wavelength to 5 nm above the first wavelength, divided by the length in nm of the part of the transmission spectrum between 400 and 470 nm that excludes 5 nm below the first wavelength to 5 nm above the first wavelength. The first average transmission is 5 to 20% less than the second average transmission.

In one embodiment, the transmission spectrum of the system has a first average transmission near the first wavelength. The first average transmission is defined as the integral of the transmission spectrum between 10 nm below the first wavelength to 10 nm above the first wavelength, divided by 20 nm. The transmission spectrum of the system has a second average transmission in the blue region excluding wavelength range used to calculate the first average transmission. The second average transmission is defined as the integral of the transmission spectrum between 400 and 470 nm minus the integral of the transmission spectrum between 10 nm below the first wavelength to 10 nm above the first wavelength, divided by the length in nm of the part of the transmission spectrum between 400 and 470 nm that excludes 10 nm below the first wavelength to 10 nm above the first wavelength. The first average transmission is 5 to 20% less than the second average transmission.

In one embodiment, the transmission spectrum of the system has a first average transmission near the first wavelength. The first average transmission is defined as the integral of the transmission spectrum between 20 nm below the first wavelength to 20 nm above the first wavelength, divided by 40 nm. The transmission spectrum of the system has a second average transmission in the blue region excluding wavelength range used to calculate the first average transmission. The second average transmission is defined as the integral of the transmission spectrum between 400 and 470 nm minus the integral of the transmission spectrum between 20 nm below the first wavelength to 20 nm above the first wavelength, divided by the length in nm of the part of the transmission spectrum between 400 and 470 nm that excludes 20 nm below the first wavelength to 20 nm above the first wavelength. The first average transmission is 5 to 20% less than the second average transmission.

In one embodiment, the transmission spectrum of the system further comprises at least one inflection point at a wavelength lower than the first wavelength.

In one embodiment, the transmission spectrum of the system has a second local minimum in transmission at a second wavelength in the range 400 nm-470 nm. The second wavelength is different from the first wavelength. In one embodiment, the first wavelength is within 15 nm of 435 nm and the second wavelength is within 15 nm of 455 nm. In one embodiment, the first and second wavelengths are at least 10 nm apart.

In one embodiment, the system has a luminous transmittance greater than or equal to 8%. In one embodiment, the system has a red traffic signal transmittance greater than or equal to 8%, a yellow traffic signal transmittance greater than or equal to 6%, and a green traffic signal transmittance greater than or equal to 6%.

In one embodiment, the system comprises a selective light blocking element having a transmission spectrum.

In one embodiment, the transmission spectrum of the light blocking element has a third local minimum in transmission at a third wavelength. The third wavelength is within 35 nm of 435 nm.

In one embodiment, the transmission spectrum of the light blocking element has an average transmission of at least 80% across the visible spectrum, and the third local minimum is at least 10% below the average transmission of the light blocking element across the visible spectrum. In one embodiment, the transmission spectrum of the light blocking element has an average transmission of at least 85% across the visible spectrum, and the third local minimum is at least 10% below the average transmission of the light blocking element across the visible spectrum. In one embodiment, the transmission spectrum of the light blocking element has an average transmission of at least 90% across the visible spectrum, and the third local minimum is at least 10% below the average transmission of the light blocking element across the visible spectrum.

In one embodiment, the transmission spectrum of the selective light blocking element has a fourth local minimum in transmission at a fourth wavelength in the range 400 nm-470 nm. The fourth wavelength is different from the third wavelength.

In one embodiment, the third wavelength is within 15 nm of 435 nm and the fourth wavelength is within 15 nm of 455 nm. In one embodiment, the third and fourth wavelengths are within 10 nm of each other.

In one embodiment, for at least one point within 10 nm of the third wavelength on the positive side, the slope of the transmission spectrum of the selective light blocking element is at least 0.5% transmittance per nm. In one embodiment, for at least one point within 10 nm of the third wavelength on the negative side, the slope of the transmission spectrum of the selective light blocking element is negative and has an absolute value of at least 0.5% transmittance per nm.

In one embodiment, transmission spectrum of the selective light blocking element has a first average transmission near the third wavelength defined as the integral of the transmission spectrum of the selective light blocking element between 5 nm below the third wavelength to 5 nm above the third wavelength, divided by 10 nm. The transmission spectrum of the selective light blocking element has a second average transmission in the blue region excluding wavelength range used to calculate the first average transmission. The second average transmission is defined as the integral of the transmission spectrum of the light blocking element between 400 and 470 nm minus the integral of the transmission spectrum between 5 nm below the third wavelength to 5 nm above the third wavelength, divided by the length in nm of the part of the transmission spectrum of the light blocking element between 400 and 470 nm that excludes 5 nm below the third wavelength to 5 nm above the third wavelength. The first average transmission is 5 to 20% less than the second average transmission.

In one embodiment, transmission spectrum of the selective light blocking element has a first average transmission near the third wavelength defined as the integral of the transmission spectrum of the selective light blocking element between 10 nm below the third wavelength to 10 nm above the third wavelength, divided by 20 nm. The transmission spectrum of the selective light blocking element has a second average transmission in the blue region excluding wavelength range used to calculate the first average transmission. The second average transmission is defined as the integral of the transmission spectrum of the light blocking element between 400 and 470 nm minus the integral of the transmission spectrum between 10 nm below the third wavelength to 10 nm above the third wavelength, divided by the length in nm of the part of the transmission spectrum of the light blocking element between 400 and 470 nm that excludes 10 nm below the third wavelength to 10 nm above the third wavelength. The first average transmission is 5 to 20% less than the second average transmission.

In one embodiment, transmission spectrum of the selective light blocking element has a first average transmission near the third wavelength defined as the integral of the transmission spectrum of the selective light blocking element between 20 nm below the third wavelength to 20 nm above the third wavelength, divided by 40 nm. The transmission spectrum of the selective light blocking element has a second average transmission in the blue region excluding wavelength range used to calculate the first average transmission. The second average transmission is defined as the integral of the transmission spectrum of the light blocking element between 400 and 470 nm minus the integral of the transmission spectrum between 20 nm below the third wavelength to 20 nm above the third wavelength, divided by the length in nm of the part of the transmission spectrum of the light blocking element between 400 and 470 nm that excludes 20 nm below the third wavelength to 20 nm above the third wavelength. The first average transmission is 5 to 20% less than the second average transmission.

In one embodiment, the transmission spectrum of the selective blocking element only has one local minimum within the wavelength range 400 nm to 470 nm. In one embodiment, the value of the transmission spectrum of the system drops by at least 5% relative to an otherwise equivalent system without the selective light blocking element at the third wavelength.

In one embodiment, the selective light blocking element is one of or a combination of a dye or a dielectric mirror. In one embodiment, the selective light blocking element comprises a rugate filter.

In one embodiment, the selective blocking element is one or more dyes selected or co-selected from: bilirubin; chlorophyll a, diethyl ether; chlorophyll a, methanol; chlorophyll b; diprotonated-tetraphenylporphyrin; hematin; magnesium octaethylporphyrin; magnesium octaethylporphyrin (MgOEP); magnesium phthalocyanine (MgPc), PrOH; magnesium phthalocyanine (MgPc), pyridine; magnesium tetramesitylporphyrin (MgTMP); magnesium tetraphenylporphyrin (MgTPP); octaethylporphyrin; phthalocyanine (Pc); porphin; tetra-t-butylazaporphine; tetra-t-butylnaphthalocyanine; tetrakis(2,6-dichlorphenyl)porphyrin; tetrakis (o-aminophenyl)porphyrin; tetramesitylporphyrin (TMP); tetraphenylporphyrin (TPP); vitamin B12; zinc octaethylporphyrin (ZnOEP); zinc phthalocyanine (ZnPc), pyridine; zinc tetramesitylporphyrin (ZnTMP); zinc tetramesitylporphyrin radical cation; zinc tetrapheynlporphyrin (ZnTPP); Manganese(III) 5,10,15,20-tetra(4-pyridyl)-21H,23H-porphine chloride tetrakis(metho chloride)-10,15,20-Tetrakis (4-sulfonatophenyl)-21H,23H-porphine manganese(III) chloride, 2,3,7,8,12,13,17,18-Octaethyl-21H,23H-porphine manganese(III) chloride, Meso-tetra(N-methyl-4-pyridyl) porphine tetra chloride dihydrochloride, Meso-tetra(N-methyl-4-pyridyl)porphine tetra chloride dihydrochloride, Mn(III) meso-tetra(N-methyl-4-pyridyl)porphine pentachloride, Mn(III) meso-tetraphenylporphine chloride, palladium (II)-meso-tetra(4-fluorophenyl)tetrabenzoporphyrin (PdTPTBPF), palladium(II)-meso-tetraphenyltetranaphthoporphyrin (PdTPTNP), platinum(II)-meso-tetra(4-fluorophenyl)tetrabenzoporphyrin (PtTPTBPF), platinum(II)-meso-tetraphenyltetranaphthoporphyrin (PtTPTNP), zinc tetrakis(arylethynyl)porphyrins, perylene and derivatives thereof.

In one embodiment, the selective light blocking element is a porphyrin or derivative thereof. In one embodiment, the selective light blocking element is a dye containing a Soret band.

In one embodiment, the ophthalmic system includes an ultraviolet light filter. In on embodiment, the ophthalmic system includes an infrared filter. In one embodiment, the system further includes a photochromic dye. In one embodiment, the system comprises at least one of or a combination of a dielectric coating, a hydrophobic coating, an antireflective coating, a rugate filter, a hardcoat primer coating, a film, or a polarizing film. In one embodiment, the system comprises at least one of or a combination of a UV blocking component, an optional IR blocking component, an antiglare coating, an anti-reflective coating, an oleophobic coating, a self-cleaning coating, a self-healing coating, an antistatic film, an antimicrobial coating, or a scratch-resistant coating.

In one embodiment, a system comprises a substrate. The average value of the transmission spectrum of the system across the wavelength range 400 nm-470 nm is between 0% and 30%. The average value of the transmission spectrum of the system across the wavelength range 470 nm-700 nm is between 0% and 70%. The transmission spectrum of the system has a first local minimum in transmission at a first wavelength in the wavelength range 400 nm-470 nm.

In one embodiment, the system transmits filtered or unfiltered light to the human eye. In one embodiment, the system is not an ophthalmic lens or system. In one embodiment, the system is selected from a group consisting of: window, automotive windshield, camera flash bulb and lens, artificial lighting fixture, fluorescent, lighting or diffuser, medical instrument, surgical instrument, rifle scope, binoculars, computer monitor, television screen, lighted signs, and patio fixture. X In one embodiment, the average value of the transmission spectrum of the system across the wavelength range 400 nm-470 nm is between 5% and 30%. The average value of the transmission spectrum of the system across the wavelength range 470 nm-700 nm is between 5% and 70%.

In one embodiment, the transmission spectrum of the system at every wavelength across the wavelength range 400 nm to 470 nm is between 5% and 30%. In one embodiment, the transmission spectrum of the system at every wavelength across the wavelength range 470 nm to 700 nm is between 5% and 70%.

In one embodiment, the average value of the transmission spectrum of the system across the wavelength range 470 nm to 700 nm is between 8% and 40%.

In one embodiment, for at least one point within 10 nm of the first wavelength on the positive side, the slope of the transmission spectrum of the system is at least 0.5-4% transmittance per nm. In one embodiment, for at least one point within 10 nm of the first wavelength on the negative side, the slope of the transmission spectrum of the system is negative and has an absolute value of at least 0.5-4% transmittance per nm.

In one embodiment, at the first wavelength, the system transmits between 0.1% and 15%. In one embodiment, at the first wavelength, the system transmits between 5% and 15%.

In one embodiment, the first wavelength is within the wavelength range 425 nm to 445 nm. In one embodiment, the first wavelength is within the wavelength range 405 nm to 455 nm. In one embodiment, the first wavelength is within the wavelength range 405 nm to 465 nm. In one embodiment, the first wavelength is within the wavelength range 440 nm to 470 nm.

In one embodiment, the transmission spectrum of the system has only one local minimum within the wavelength range 400 nm to 470 nm.

In one embodiment, the transmission spectrum of the system has a first average transmission near the first wavelength. The first average transmission is defined as the integral of the transmission spectrum between 5 nm below the first wavelength to 5 nm above the first wavelength, divided by 10 nm. The transmission spectrum of the system has a second average transmission in the blue region excluding wavelength range used to calculate the first average transmission. The second average transmission is defined as the integral of the transmission spectrum between 400 and 470 nm minus the integral of the transmission spectrum between 5 nm below the first wavelength to 5 nm above the first wavelength, divided by the length in nm of the part of the transmission spectrum between 400 and 470 nm that excludes 5 nm below the first wavelength to 5 nm above the first wavelength. The first average transmission is 5 to 20% less than the second average transmission.

In one embodiment, the transmission spectrum of the system has a first average transmission near the first wavelength. The first average transmission is defined as the integral of the transmission spectrum between 10 nm below the first wavelength to 10 nm above the first wavelength, divided by 20 nm. The transmission spectrum of the system has a second average transmission in the blue region excluding wavelength range used to calculate the first average transmission. The second average transmission is defined as the integral of the transmission spectrum between 400 and 470 nm minus the integral of the transmission spectrum between 10 nm below the first wavelength to 10 nm above the first wavelength, divided by the length in nm of the part of the transmission spectrum between 400 and 470 nm that excludes 10 nm below the first wavelength to 10 nm above the first wavelength. The first average transmission is 5 to 20% less than the second average transmission.

In one embodiment, the transmission spectrum of the system has a first average transmission near the first wavelength. The first average transmission is defined as the integral of the transmission spectrum between 20 nm below the first wavelength to 20 nm above the first wavelength, divided by 40 nm. The transmission spectrum of the system has a second average transmission in the blue region excluding wavelength range used to calculate the first average transmission. The second average transmission is defined as the integral of the transmission spectrum between 400 and 470 nm minus the integral of the transmission spectrum between 20 nm below the first wavelength to 20 nm above the first wavelength, divided by the length in nm of the part of the transmission spectrum between 400 and 470 nm that excludes 20 nm below the first wavelength to 20 nm above the first wavelength. The first average transmission is 5 to 20% less than the second average transmission.

In one embodiment, the transmission spectrum of the system further comprises at least one inflection point at a wavelength lower than the first wavelength.

In one embodiment, the transmission spectrum of the system has a second local minimum in transmission at a second wavelength in the wavelength range 400 nm-470 nm. The second wavelength is different from the first wavelength.

In one embodiment, the first wavelength is within 15 nm of 435 nm and the second wavelength is within 15 nm of 455 nm. In one embodiment, the first and second wavelengths are within 10 nm of each other.

In one embodiment, the system includes a selective light blocking element having a transmission spectrum. In one embodiment, the transmission spectrum of the selective light blocking element has a third local minimum in transmission at a third wavelength; wherein the wavelength is within 35 nm of 435 nm.

In one embodiment, the transmission spectrum of the selective light blocking element has an average transmission of at least 80% across the visible spectrum, and the third local minimum is at least 10% below the average transmission of the light blocking element across the visible spectrum.

In one embodiment, the transmission spectrum of the light blocking element has an average transmission of at least 85% across the visible spectrum, and the third local minimum is at least 10% below the average transmission of the light blocking element across the visible spectrum.

In one embodiment, the transmission spectrum of the light blocking element has an average transmission of at least 90% across the visible spectrum, and the third local minimum is at least 10% below the average transmission of the light blocking element across the visible spectrum.

In one embodiment, the transmission spectrum of the selective light blocking element has a fourth local minimum in transmission at a fourth wavelength in the wavelength range 400 nm-470 nm. The fourth wavelength is different from the third wavelength.

In one embodiment, the third wavelength is within 15 nm of 435 nm and is the fourth wavelength is within 15 nm of 455 nm. In one embodiment, the third and fourth wavelengths are within 10 nm of each other.

In one embodiment, for at least one point within 10 nm of the third wavelength on the positive side, the slope of the transmission spectrum is at least 0.5% transmittance per nm. In one embodiment, for at least one point within 10 nm of the third wavelength on the negative side, the slope of the transmission spectrum is negative and has an absolute value of at least 0.5% transmittance per nm.

In one embodiment, transmission spectrum of the selective light blocking element has a first average transmission near the third wavelength defined as the integral of the transmission spectrum of the selective light blocking element between 5 nm below the third wavelength to 5 nm above the third wavelength, divided by 10 nm. The transmission spectrum of the selective light blocking element has a second average transmission in the blue region excluding wavelength range used to calculate the first average transmission. The second average transmission is defined as the integral of the transmission spectrum of the light blocking element between 400 and 470 nm minus the integral of the transmission spectrum between 5 nm below the third wavelength to 5 nm above the third wavelength, divided by the length in nm of the part of the transmission spectrum of the light blocking element between 400 and 470 nm that excludes 5 nm below the third wavelength to 5 nm above the third wavelength. The first average transmission is 5 to 20% less than the second average transmission.

In one embodiment, transmission spectrum of the selective light blocking element has a first average transmission near the third wavelength defined as the integral of the transmission spectrum of the selective light blocking element between 10 nm below the third wavelength to 10 nm above the third wavelength, divided by 20 nm. The transmission spectrum of the selective light blocking element has a second average transmission in the blue region excluding wavelength range used to calculate the first average transmission. The second average transmission is defined as the integral of the transmission spectrum of the light blocking element between 400 and 470 nm minus the integral of the transmission spectrum between 10 nm below the third wavelength to 10 nm above the third wavelength, divided by the length in nm of the part of the transmission spectrum of the light blocking element between 400 and 470 nm that excludes 10 nm below the third wavelength to 10 nm above the third wavelength. The first average transmission is 5 to 20% less than the second average transmission.

In one embodiment, transmission spectrum of the selective light blocking element has a first average transmission near the third wavelength defined as the integral of the transmission spectrum of the selective light blocking element between 20 nm below the third wavelength to 20 nm above the third wavelength, divided by 40 nm. The transmission spectrum of the selective light blocking element has a second average transmission in the blue region excluding wavelength range used to calculate the first average transmission. The second average transmission is defined as the integral of the transmission spectrum of the light blocking element between 400 and 470 nm minus the integral of the transmission spectrum between 20 nm below the third wavelength to 20 nm above the third wavelength, divided by the length in nm of the part of the transmission spectrum of the light blocking element between 400 and 470 nm that excludes 20 nm below the third wavelength to 20 nm above the third wavelength. The first average transmission is 5 to 20% less than the second average transmission.

In one embodiment, the transmission spectrum of the selective light blocking element has only one local minimum within the wavelength range 400 nm to 470 nm.

In one embodiment, the value of the transmission spectrum of the system drops by at least 5% relative to an otherwise equivalent system without the selective light blocking element at the third wavelength.

In one embodiment, the transmission spectrum of the selective light blocking element only has one local minimum within the wavelength range 400 nm to 470 nm.

In one embodiment, the selective light blocking element is one of or a combination of a dye or a dielectric mirror.

In one embodiment, the selective light blocking element comprises a rugate filter.

In one embodiment, the selective blocking element is one or more dyes selected or co-selected from: bilirubin; chlorophyll a, diethyl ether; chlorophyll a, methanol; chlorophyll b; diprotonated-tetraphenylporphyrin; hematin; magnesium octaethylporphyrin; magnesium octaethylporphyrin (MgOEP); magnesium phthalocyanine (MgPc), PrOH; magnesium phthalocyanine (MgPc), pyridine; magnesium tetramesitylporphyrin (MgTMP); magnesium tetraphenylporphyrin (MgTPP); octaethylporphyrin; phthalocyanine (Pc); porphin; tetra-t-butylazaporphine; tetra-t-butylnaphthalocyanine; tetrakis(2,6-dichlorphenyl)porphyrin; tetrakis (o-aminophenyl)porphyrin; tetramesitylporphyrin (TMP); tetraphenylporphyrin (TPP); vitamin B12; zinc octaethylporphyrin (ZnOEP); zinc phthalocyanine (ZnPc), pyridine; zinc tetramesitylporphyrin (ZnTMP); zinc tetramesitylporphyrin radical cation; zinc tetrapheynlporphyrin (ZnTPP); Manganese(III) 5,10,15,20-tetra(4-pyridyl)-21H,23H-porphine chloride tetrakis(metho chloride)-10,15,20-Tetrakis (4-sulfonatophenyl)-21H,23H-porphine manganese(III) chloride, 2,3,7,8,12,13,17,18-Octaethyl-21H,23H-porphine manganese(III) chloride, Meso-tetra(N-methyl-4-pyridyl) porphine tetra chloride dihydrochloride, Meso-tetra(N-methyl-4-pyridyl)porphine tetra chloride dihydrochloride, Mn(III) meso-tetra(N-methyl-4-pyridyl)porphine pentachloride, Mn(III) meso-tetraphenylporphine chloride, palladium (II)-meso-tetra(4-fluorophenyl)tetrabenzoporphyrin (PdTPTBPF), palladium(II)-meso-tetraphenyltetranaphthoporphyrin (PdTPTNP), platinum(II)-meso-tetra(4-fluorophenyl)tetrabenzoporphyrin (PtTPTBPF), platinum(II)-meso-tetraphenyltetranaphthoporphyrin (PtTPTNP), zinc tetrakis(arylethynyl)porphyrins, perylene and derivatives thereof.

In one embodiment, the selective light blocking element is a porphyrin dye or derivative thereof.

In one embodiment, the selective light blocking element is a dye containing a Soret band.

In one embodiment, the system further includes an ultraviolet light filter.

In one embodiment, the system further includes an infrared filter.

In one embodiment, the system further includes a photochromic dye.

In one embodiment, the system comprises at least one of or a combination of a dielectric coating, a hydrophobic coating, an antireflective coating, a rugate filter, a hardcoat primer coating, a film, or a polarizing film.

In one embodiment, the system comprises at least one of or a combination of a UV blocking component, an optional IR blocking component, an anti-glare coating, an anti-reflective coating, an oleophobic coating, a self-cleaning coating, a self-healing coating, an anti-static film, an anti-microbial coating, or a scratch-resistant coating.

BRIEF DESCRIPTION OF THE DRAWINGS/FIGURES

DETAILED DESCRIPTION OF THE INVENTION

Figure 1:
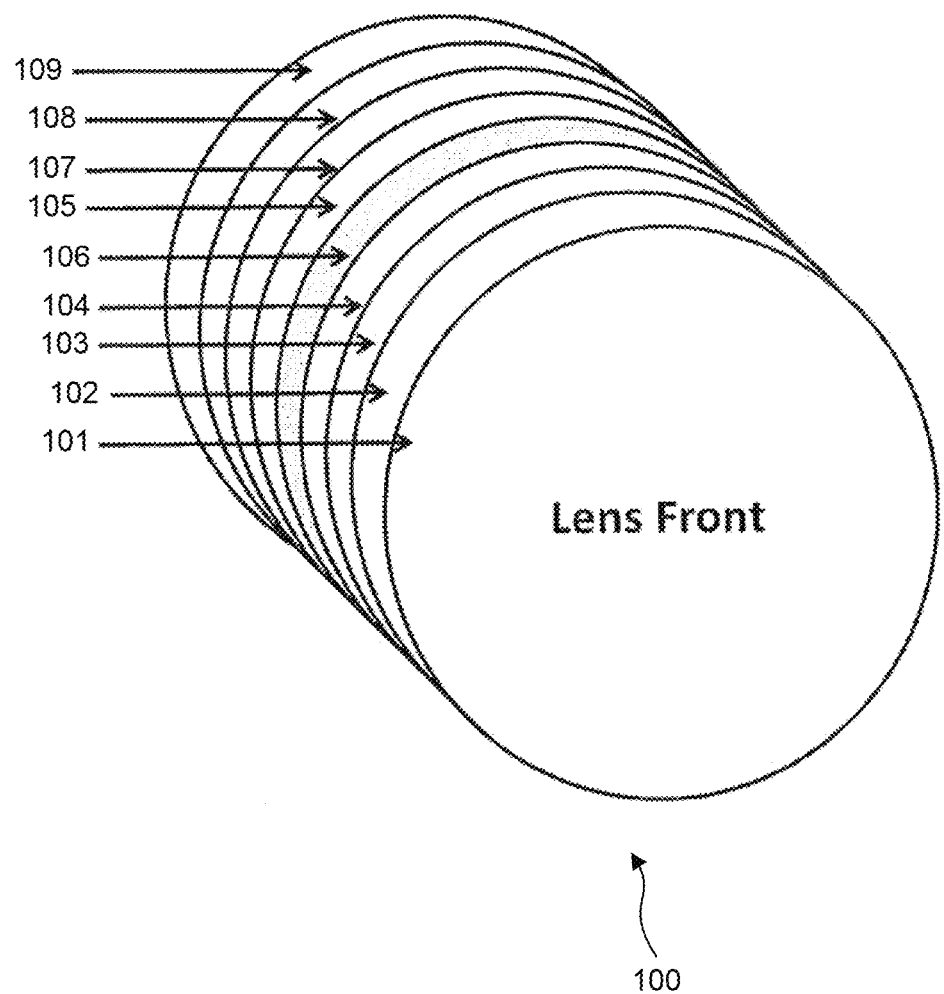
FIG. 1 shows an ophthalmic lens having a combination of reflection and absorption coatings for selective blocking.

Blue light wavelengths fall in the approximate range of 400 nm to 500 nm. For the ultra-violet bands, UVB wavelengths are from 290 nm to 320 nm, and UVA wavelengths are from 320 nm to 400 nm. Gamma and x-rays make up the higher frequencies of this spectrum and are absorbed by the atmosphere. The wavelength spectrum of ultraviolet radiation (UVR) is 100-400 nm.

While the human retina responds only to the visible light portion of the electromagnetic spectrum, all wavelengths have the capability to damage the eye. The ozone layer generally absorbs wavelengths up to 286 nm, thus shield living beings from exposure to radiation with the highest energy. However, over the last 20 years, there has been documented depletion of the ozone layer primarily due to industrial pollution. Increased exposure to UVR has broad public health implications as an increased burden of UVR ocular and skin disease is to be expected. Additionally, human beings are exposed to wavelengths above 286 nm, including the UVA range. Thus, it is desirable for systems that transmit light to the eye to have additional shielding from these wavelengths in order to enhance the protection given by the ozone layer.

Many of the wavelengths above 286 nm fall within the human visual spectrum (400-700 nm). The shorter wavelengths of the visible spectrum pose the greatest hazard because they inversely contain more energy. Blue light has been shown to be the portion of the visible spectrum that produces the most photochemical damage to animal retinal pigment epithelium (RPE) cells. Exposure to these wavelengths has been called the blue light hazard because these wavelengths are perceived as blue by the human eye.

Cataracts and macular degeneration are widely thought to result from photochemical damage to the intraocular lens and retina, respectively. Blue light exposure has also been shown to accelerate proliferation of uveal melanoma cells. The most energetic photons in the visible spectrum have wavelengths between 380 and 500 nm and are perceived as violet or blue. The wavelength dependence of phototoxicity summed over all mechanisms is often represented as an action spectrum, such as is described in Mainster and Sparrow, "How Much Blue Light Should an IOL Transmit?" Br. J. Ophthalmol., 2003, v. 87, pp. 1523-29 and FIG. 6. In eyes without an intraocular lens (aphakic eyes), light with wavelengths shorter than 400 nm can cause damage. In phakic eyes, this light is absorbed by the intraocular lens and therefore does not contribute to retinal phototoxicity; however it can cause optical degradation of the lens or cataracts.

The pupil of the eye responds to the photopic retinal illuminance, in trolands, which is the product of the incident flux with the wavelength-sensitivity of the retina and the projected area of the pupil. This sensitivity is described in Wyszecki and Stiles, Color Science: Concepts and Methods, Quantitative Data and Formulae (Wiley: New York) 1982, esp. pages 102-107.

Current research strongly supports the premise that short wavelength visible light (blue light) having a wavelength of approximately 400 nm-500 nm could be a contributing cause of AMD (age related macular degeneration). It is believed that the highest level of blue light absorption occurs in a region around 430-435 nm, such as 400 nm-460 nm. Research further suggests that blue light worsens other causative factors in AMD, such as heredity, tobacco smoke, and excessive alcohol consumption.

The human retina includes multiple layers. These layers listed in order from the first exposed to any light entering the eye to the deepest include:
1) Nerve Fiber Layer
2) Ganglion Cells
3) Inner Plexiform Layer
4) Bipolar and Horizontal Cells
5) Outer Plexiform Layer
6) Photoreceptors (Rods and Cones)
7) Retinal Pigment Epithelium (RPE)
8) Bruch's Membrane
9) Choroid When light is absorbed by the eye's photoreceptor cells, (rods and cones) the cells bleach and become unreceptive until they recover. This recovery process is a metabolic process and is called the "visual cycle." Absorption of blue light has been shown to reverse this process prematurely. The function of the RPE is to provide nourishment to the retina's photoreceptors. The premature reversal increases the risk of oxidative damage and is believed to lead to the buildup of the pigment lipofuscin in the retina. This build up occurs in the retinal pigment epithelium (RPE) layer and interferes with its ability to provide nourishment. It is believed that aggregates of extra-cellular materials called drusen are formed due to the excessive amounts of lipofuscin.

Current research indicates that over the course of one's life, beginning with that of an infant, metabolic waste byproducts accumulate within the RPE, due to light interactions with the retina. This metabolic waste product is characterized by certain fluorophores, one of the most prominent being lipofuscin constituent A2E. In vitro studies by Sparrow indicate that lipofuscin chromophore A2E found within the RPE is maximally excited by 430-435 nm light. It is theorized that a tipping point is reached when a combination of a build-up of this metabolic waste (specifically the lipofuscin fluorophore) has achieved a certain level of accumulation, the human body's physiological ability to metabolize within the retina certain of this waste has diminished as one reaches a certain age threshold, and a blue light stimulus of the proper wavelength causes drusen to be formed in the RPE layer. It is believed that the drusen then further interferes with the normal physiology/metabolic activity which allows for the proper nutrients to get to the photoreceptors thus contributing to age-related macular degeneration (AMD). AMD is the leading cause of irreversible severe visual acuity loss in the United States and Western World. The burden of AMD is expected to increase dramatically in the next 20 years because of the projected shift in population and the overall increase in the number of ageing individuals.

Drusen hinders or blocks the RPE layer from providing the proper nutrients to the photoreceptors, which leads to damage or even death of these cells. To further complicate this process, it appears that when lipofuscin absorbs blue light in high quantities it becomes toxic, causing further damage and/or death of the RPE cells. It is believed that the lipofuscin constituent A2E is at least partly responsible for the short-wavelength sensitivity of RPE cells. A2E has been shown to be maximally excited by blue light; the photochemical events resulting from such excitation can lead to cell death. See, for example, Janet R. Sparrow et al., "Blue light-absorbing intraocular lens and retinal pigment epithelium protection in vitro," J. Cataract Refract. Surg. 2004, vol. 30, pp. 873-78.

From a theoretical perspective, the following appears to take place:
1) Waste buildup occurs within the pigment epithelial level starting from infancy throughout life.
2) Retinal metabolic activity and ability to deal with this waste typically diminish with age.
3) The macula pigment typically decreases as one ages, thus filtering out less blue light.
4) Blue light causes the lipofuscin to become toxic. The resulting toxicity damages pigment epithelial cells.

The lighting and vision care industries have standards as to human vision exposure to UVA and UVB radiation. Surprisingly, no such standard is in place with regard to blue light. For example, in the common fluorescent tubes available today, the glass envelope mostly blocks ultra-violet light but blue light is transmitted with little attenuation. In some cases, the envelope is designed to have enhanced transmission in the blue region of the spectrum. Such artificial sources of light hazard may also cause eye damage.

Laboratory evidence by Sparrow at Columbia University has shown that if about 50% of the blue light within the wavelength range of 430±30 nm is blocked, RPE cell death caused by the blue light may be reduced by up to 80%.

Thus, it is desirable to have light transmitting systems that selectively block the harmful range of blue light. Many systems such as sunglasses and tinted windows provide overall reduced light transmission to protect the human eye from UV and visible light but do not selectively block this damaging range of blue light. Thus, there is a need for systems that provide synergistic combination of UV protection, reduced overall light transmission, and selective blocking in the 400-470 nm range. Additionally, it is desirable that these systems meet specific color transmission standards when intended to be used in certain driving conditions.

FIG. 1 shows a system 100 including an ophthalmic lens matrix according to one embodiment. The system's transmission spectrum is such that the system is able to synergistically combine low overall light transmission and selective blocking of harmful blue wavelengths. As used herein, inhibit, block, and filter mean the same.

Across the wavelength range of 470 nm-700 nm, the average value of the transmission spectrum of system 100 is between 0% and 70%. In one embodiment, the average value is between 20% and 70%. In one embodiment, this average value is between 8% and 40%. These average transmission values allow the system to be used as a light blocking system, such as in sunglasses, car windshield, or industrial system. Across the wavelength range 400 nm-470 nm, however, the transmission spectrum of system 100 has an average value between 0% and 30%, and preferably an average value between 5% and 30%. The transmission spectrum also has a first local minimum in its transmission at a first wavelength in the wavelength range 400 nm-470 nm. The lower transmission value across the wavelength range 400-470 nm and the local minimum at the first wavelength helps to maximally protect the human eye from lipofuscin accumulation and subsequent death of RPE cells. Thus, this system 100 is able to provide reduced overall light transmission and enhanced protection from harmful blue light wavelengths.

As used herein, the "average transmission" of a spectrum across a wavelength range is calculated by integrating the spectrum to determine the area under the transmittance curve, and dividing by the length of the wavelength range. In other words, the average transmission is the average height of the transmission curve, where each unit wavelength is given equal weight in calculating the average. Where a range for "average transmission" across a wavelength range is claimed or described, the transmission at individual wavelength points within the wavelength range may be higher or lower than the claimed range for the average, so long as the average itself falls within the claimed range. So, for example, a spectrum having a transmission of 90% at most wavelengths in a wavelength range, but a transmission of 50% at just a few wavelengths in the wavelength range, would have an "average transmission" above 80% across the wavelength range because the calculation described above would result in a number close to 90%, notwithstanding the fact that the transmission at a few points is well below 80%.

In one embodiment, instead of being an average value across the specified wavelength range, the transmission spectrum has a specific value at every wavelength within the specified wavelength range. For example, the transmission spectrum of the system at every wavelength across the wavelength range 470 nm to 700 nm may be between 20% and 70%. Thus, at every wavelength in the range 470 nm to 700 nm, the system transmits from 20% to 70% of light. Additionally, in one embodiment, the transmission spectrum of the system at every wavelength across the wavelength range 400 nm to 470 nm is between 5% and 30%.

In one embodiment, the transmission spectrum of the system 100 has a first local minimum at a first wavelength in the wavelength range 400 nm-470 nm. As discussed above, this local minimum helps to enhance protection from lipofuscin accumulation and subsequent death of RPE cells. The local minimum of the system may be accomplished with a selective light blocking element. This may include any means of reflection, absorption, interference, and other equivalent means known. Additionally, it may be a combination of those listed.

Generally, at this first wavelength, the transmission of the system is lower than at other wavelengths. One way to characterize this is by determining how much light is transmitted at the first wavelength. In one embodiment, at the first wavelength where the local minimum occurs, the system transmits between 0.1% and 15% of light. In another embodiment, the system transmits between 5% and 15% at the first wavelength.

Another way to characterize the transmission spectrum at and near the first wavelength is by determining the slope of the transmission spectrum at wavelengths near the first wavelength. In one embodiment, for at least one point within 10 nm of the first wavelength on the positive side, the slope of the transmission spectrum of the system is at least 0.5% transmittance per nm. This slope may be infinite (a vertical line). However, in one preferred embodiment, the slope is at most 4%. As used herein, "positive side" means on the side of the first wavelength where the wavelengths are longer than the first wavelength. In one embodiment, for at least one point within 10 nm of the first wavelength on the negative side, the slope of the transmission spectrum of the system is negative but has an absolute value of at least 0.5% transmittance per nm. This slope may be infinite (a vertical line). However, in one preferred embodiment, the slope is at most 4%. As used herein, "negative side" means on the side of the first wavelength where the wavelengths are shorter than the first wavelength. A system with these slope ranges may have a relatively steep and quick transition to and from the lower transmittance value at the first wavelength.

Figure 12:
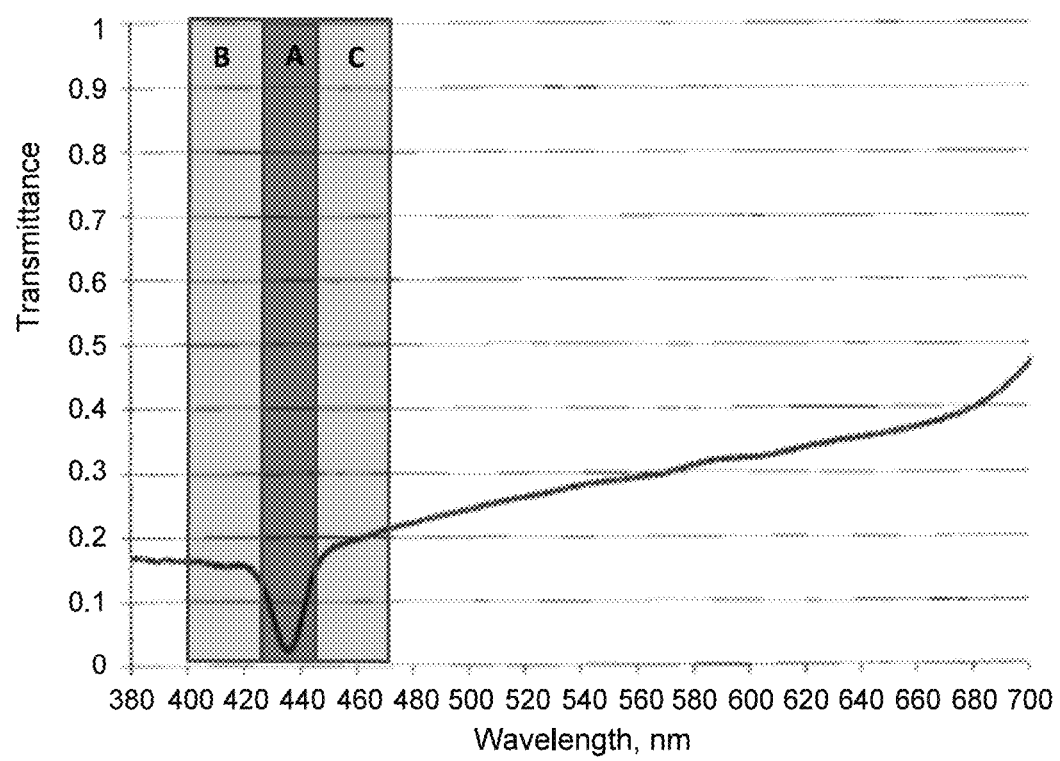
FIG. 12 shows a schematic representation of wavelength regions over which average transmission values may be calculated in one embodiment of characterizing the transmission spectrum of the system.

Another way to characterize the transmission spectrum of the system at and near the first wavelength is by comparing two average transmission values of the system. The first average value is the average transmission of the system across a limited wavelength range that includes the first wavelength. The second average value is the average transmission of the system across wavelengths 400-470 nm excluding the wavelength range used to determine the first average transmission value. The first value is 5 to 20% less than the second value. A schematic representation of the two different wavelength regions is shown in FIG. 12.

The steps to determine this are as follows: (1) A first average transmission near the first wavelength is determined. This first average value is defined as the integral of the transmission spectrum between "X" nm below the first wavelength to "X" nm above the first wavelength, divided by the two times the value of "X". In one embodiment, the value of "X" may be 5 nm, 10 nm, or 20 nm. For example, in FIG. 12, this wavelength region is represented by region A where "X" is 10 nm. (2) A second average transmission in the blue wavelength region is then determined. This wavelength region excludes the wavelength range used to calculate the first average transmission and is represented by only regions B and C in FIG. 12. The second average transmission may be determined by taking the integral of the transmission spectrum between 400 and 470 nm and subtracting the integral of the transmission spectrum between "X" nm below the first wavelength to "X" nm above the first wavelength. The difference of these values is divided by the length in nm of the part of the transmission spectrum between 400 and 470 nm that excludes the wavelength range of "X" nm below the first wavelength to "X" nm above the first wavelength. As noted above, it is preferred that the first average transmission (1) is about 5 to 20% less than the second average transmission (2). Where X is 10 nm, the length in nm of the part of the transmission spectrum between 400 and 470 nm that excludes "X" nm below the first wavelength to "X" nm above the first wavelength is generally 50 nm, but may be greater if the first wavelength is within 10 nm of 400 nm or within 10 nm of 470 nm.

FIGS. 2-7 show possible transmission spectra of system 100. As seen in these FIGS., the first wavelength may be located in a variety of ranges of wavelengths within the range 400-470 nm.

Figure 2:
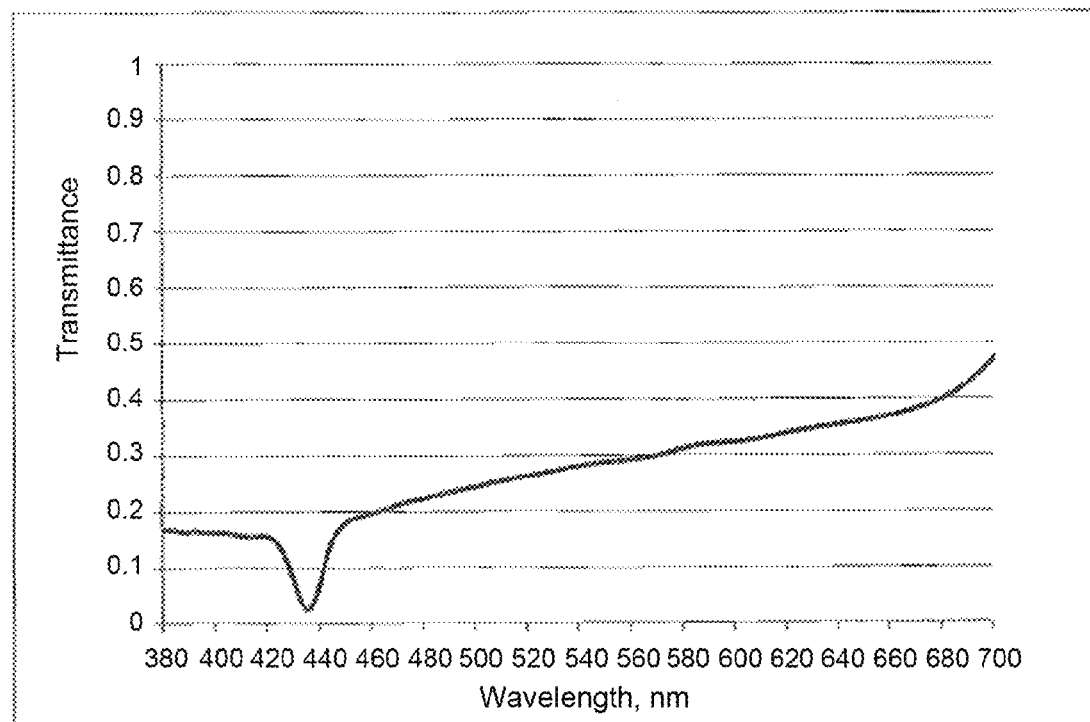
FIG. 2 shows the transmission spectrum of a system according to one embodiment with selective blocking in the wavelength range of 435 nm±10 nm.
Figure 3:
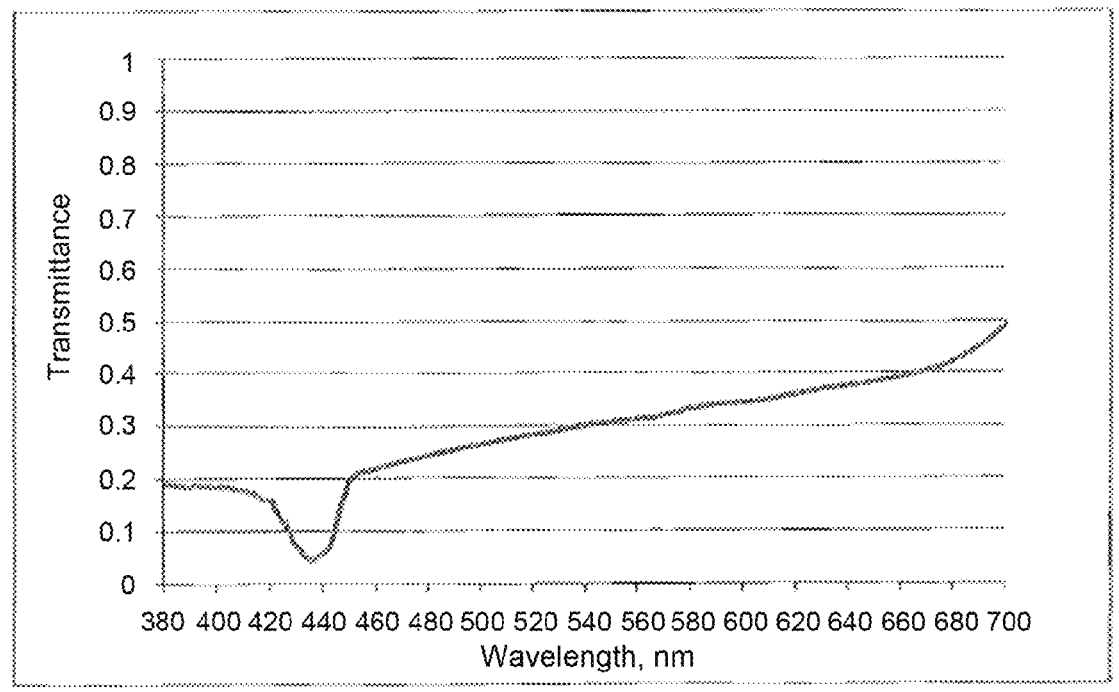
FIG. 3 shows the transmission spectrum of a system according to one embodiment with selective blocking in the wavelength range of 435 nm±20 nm.
Figure 4:
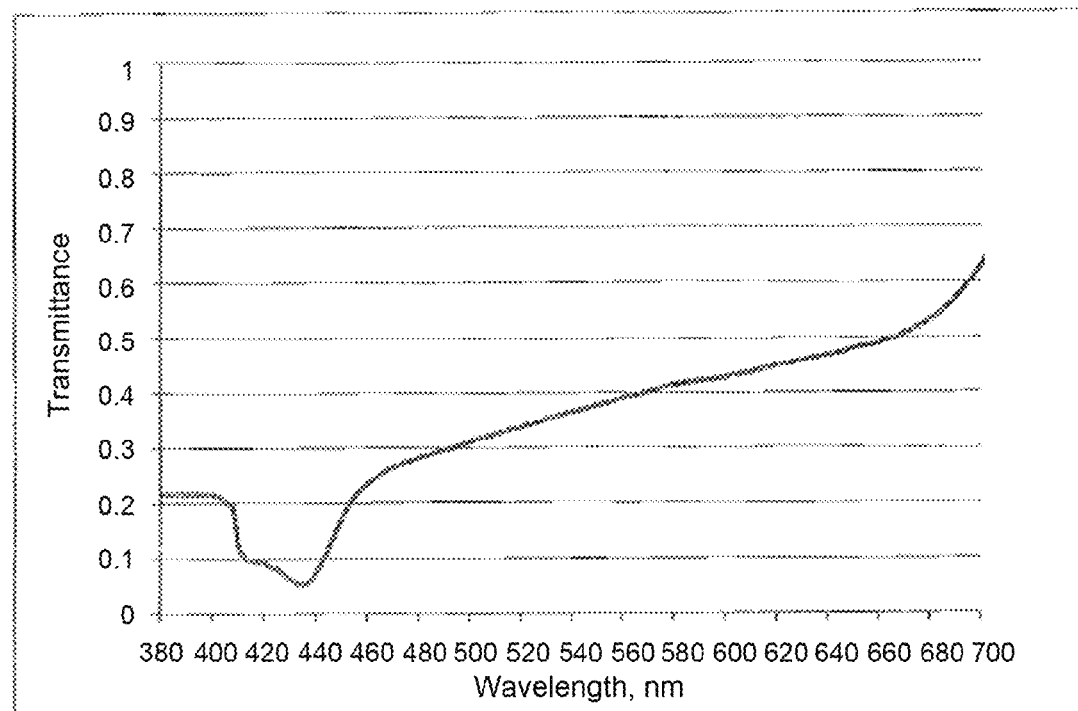
FIG. 4 shows the transmission spectrum of a system according to one embodiment with selective blocking in the wavelength range of 435 nm±30 nm.
Figure 5:
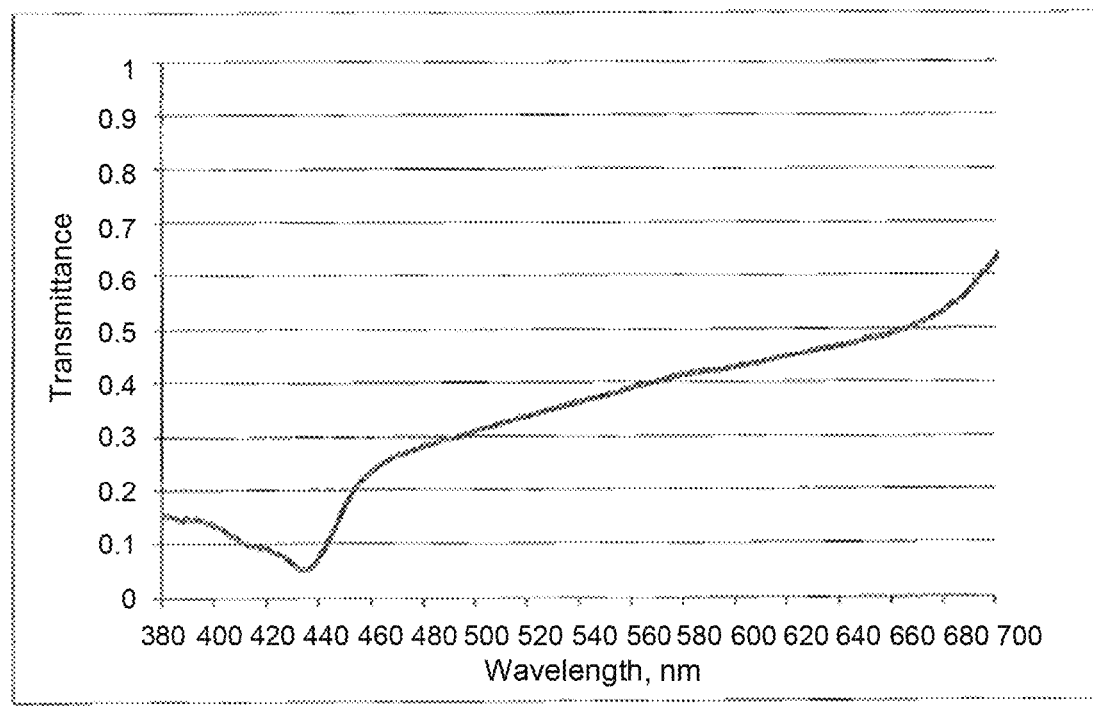
FIG. 5 shows the transmission spectrum of a system according to one embodiment with selective blocking in the wavelength range of 435 nm±35 nm.

In FIG. 2, the first wavelength is within the range 425 nm to 445 nm. As seen in FIG. 3, the first wavelength may be within the range 405 nm to 455 nm. As seen in FIG. 4, the first wavelength may be within the range 405 nm to 465 nm. As seen in FIG. 5, the first wavelength may be within the range 400 nm to 470 nm.

Additionally, in another embodiment, the first wavelength may be within the range 435 nm to 475 nm, with the wavelength being at 455±10 nm, 455±15 nm, or 455±20 nm. Blocking at these ranges may reduce glare and eyestrain from LED lights or other artificial lights that may cause visual strain in this wavelength region.

Figure 6:
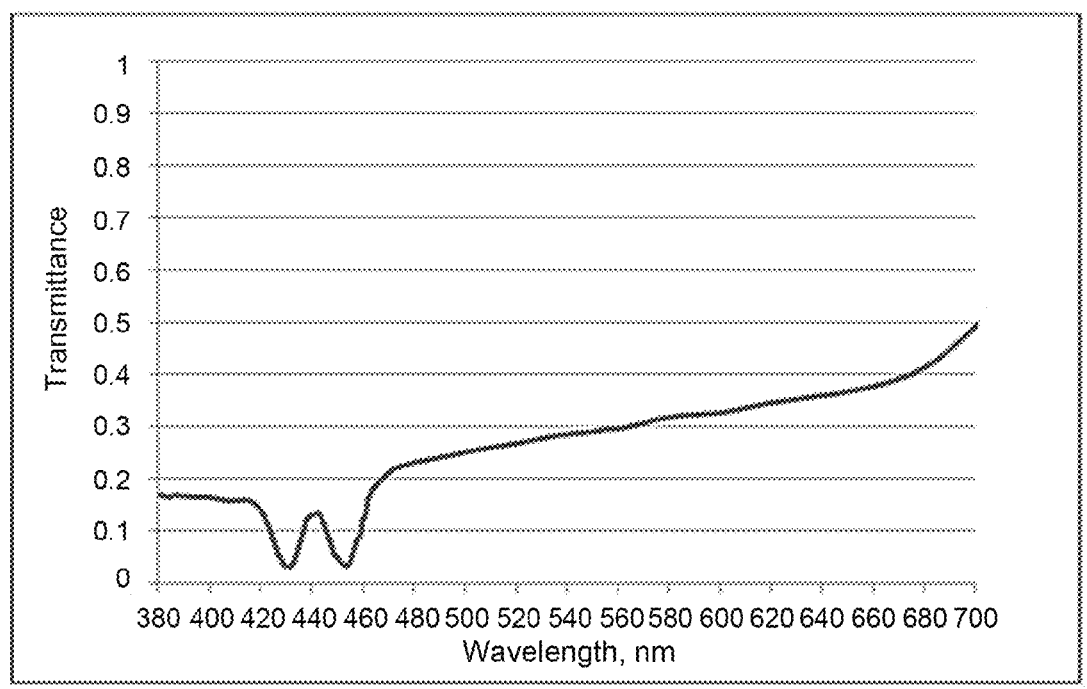
FIG. 6 shows the transmission spectrum of a system with two local minima.

In one embodiment, the transmission spectrum of the system 100 has only one local minimum within the wavelength range 400 nm to 470 nm. However, more than one local minimum is possible. In one embodiment, as seen in FIG. 6, the transmission spectrum of the system has a second local minimum in transmission at a second wavelength within the range 400 nm to 470 nm. The second wavelength is different from the first wavelength. The first and second wavelengths may be at any wavelength within the range 400 nm to 470 nm. In one embodiment, however, the first wavelength is within 15 nm of 435 nm and the second wavelength is within 15 nm of 455 nm. In one embodiment, the first and second wavelengths are at least 10 nm apart.

Figure 7:
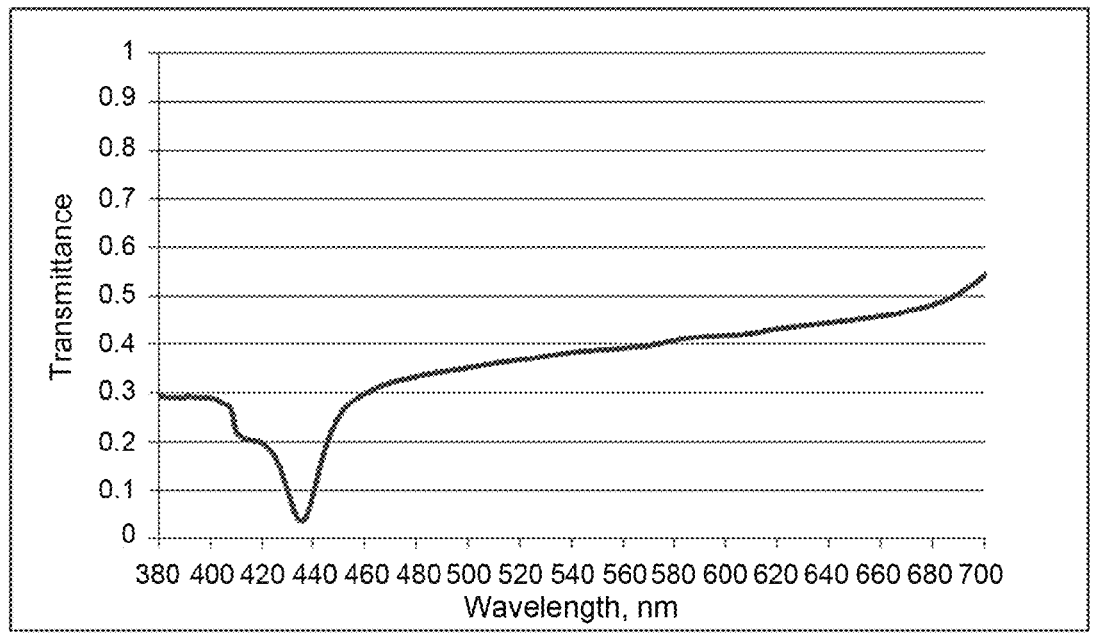
FIG. 7 shows the transmission spectrum of a system with a shoulder according to one embodiment.

The transmission spectrum of the system 100 may also have a shoulder. In many cases, an inflection point, as shown in FIGS. 4 and 7, is indicative of a shoulder. This is, however, not in all cases. As used herein, an inflection point includes a point where the slope turns from concave up to convex down, or vice versa. Mathematically, this may be characterized when the second derivative of the transmission spectrum changes from negative to positive or from positive to negative. The inflection point may occur within the wavelength ranges 400 nm to 470 nm and may be anywhere in relation to the first wavelength. However, in one embodiment, the inflection point is at a wavelength that is shorter than the first wavelength.

found at www.arpansa.gov/au/pubs/factsheets/sunglas_brochure.pdf. Embodiments herein may be configured to meet the standards suitable for driving.

TABLE 1

| Lens category | Luminous transmission % (Tv) | max Transmission 280-315 nm | max transmission 315-350 nm | max solar UVA 315-400 nm |
| --- | --- | --- | --- | --- |
| 0 | 80-100 | 0.05 Tv | Tv | Tv |
| 1 | 43-80 | 0.05 Tv | Tv | Tv |
| 2 | 18-43 | 0.05 Tv | Tv | Tv |
| 3 | 8-18 | 0.05 TV | 0.50 Tv | 0.50 Tv |
| 4 | 3-8 | 0.05 Tv | 0.50 TV | 0.50 Tv |

Embodiments herein may be configured so that they are suitable for driving situations through the American National Standards. In embodiments meant for use in driving situations, the ANSI identifies certain characteristics that may affect the ability of the system to accurately reflect driving signs. Table 2 represents transmittance prosperities for nonprescription sunglasses and cosmetic lens.

TABLE 2

| | | | Transmittance properties relating to traffic signal recognition | | | Mean transmittance to $\tau$ ($\lambda 1$ to $\lambda 2$) ultraviolent spectral region | | | |
| --- | --- | --- | --- | --- | --- | --- | --- | --- | --- |
| | | | | | | UVB or erythermal zone | | UVA or near zone | |
| | | Color limits | Minimum traffic signal transmittance $\tau$ (sig) | | | (280-315 nm) | | (315-380 nm) | |
| Primary function and shade | Luminous transmittance | and chromaticity coordinates | Red signal | Yellow signal | Green signal | Normal use | High and prolonged exposure | Normal use | High and prolonged exposure |
| Cosmetic lens or shield, light | Greater than 40% | Refer to FIG. 1 | 8% | 6% | 6% | 0.125 $\tau v$ max | 1% max | $\tau v$ max | 0.5 $\tau v$ max |
| General Purposes lens or shield, medium to dark | 8-40% | Refer to FIG. 1 | 8% | 6% | 6% | 0.125 $\tau v$ max | 1% max | $\tau v$ max | 0.5 $\tau v$ max |
| Special Purpose lens or shield, very dark | 3-8% | Data do not meet the requirements of 4.6.3 | | | | 1% max | 1% max | 0.6 $\tau v$ max | 0.5 $\tau v$ max |
| Special purposes lens or shield, strongly colored | Greater than 8% | Data do not meet the requirements of 4.6.3 (see Notes below) | | | | 1% max | 1% max | 0.6 $\tau v$ max | 0.5 $\tau v$ max |

Embodiments disclosed herein may be used during driving situations. Thus, they may be configured to synergistically combine elements that reduce light transmission to a level that meets international and national standards so as to be worn safely by the general public without negatively impacting proper color limits and traffic light recognition. For example, one such system may be sunglasses which are popularly worn during driving.

Generally, sunglasses worn during driving may need to meet certain standards. Australia introduced the world's first national standards in 1971. Currently, the joint Australian/New Zealand standard AS/NZS 1067:2003 includes five lens categories. Category four are designated "special purpose sunglasses" and are generally not suitable for driving. Category three, which is suitable for driving, includes 8-18% luminous transmission and a maximum transmittance in the 280-318 nm range of 0.05 Tv, in the 315-350 nm range of 0.50 Tv, and in the 315-400 nm range of 0.50 Tv. Table 1 outlines the transmittance values for all five lens categories. More information regarding these categories can be As can be seen, these characteristics include but are not limited to luminous transmittance of the system and traffic signal recognition of the system. Table 2 indicates that the luminous transmittance for general purpose lenses or shield, medium to dark, which generally represent sunglasses, have around 8-40% luminous transmittance.

Luminous transmittance is a function of the spectral transmittance of the lens weighted by the corresponding ordinates of the photopic luminous efficiency of the 1931 CIE standard colorimetric observer and by the spectral intensity of standard illuminant C. Standard illuminant C represents sunlight. Mathematically, the luminous transmittance of a system can be expressed as:

$$\tau_v = \frac{\int_{380}^{780} \tau(\lambda)V(\lambda)S_C(\lambda)d\lambda}{\int_{380}^{780} V(\lambda)S_C(\lambda)d\lambda}$$

τ(λ) is the spectral transmittance of the lens, V(λ) is the spectral ordinate of the photopic luminous efficiency distribution of the 1931 CIE standard colorimetric observer. $S_c(\lambda)$ is the spectral intensity of Standard Illuminant C. More information regarding this can be found in the ANSI Standards. In one embodiment, the system has a luminous transmittance greater than or equal to 8% to pass standards. This luminous transmittance value is preferably as low as possible and may be as high as 100%, but is preferably at a maximum of around 40%. One way to determine the luminous transmittance of a lens is by a photometer that has been color corrected to produce a spectral sensitivity approximately equivalent to the spectral distribution of CIE Illuminant C as perceived by the 1931 CIE standard observer. Another way is through the visual method. This is through using an observer having normal color vision as determined by recognized color vision chart tests. The light source must have a spectral distribution approximately equivalent to CIE Illuminant C.

Table 2 also characterizes the red, yellow, and green traffic signal transmittance that are suitable in general purpose lens. Traffic signal transmittance is a function of the spectral transmittance of the lens. This is then weighted by the corresponding ordinates of the phototopic luminous efficiency distribution of the 1931 CIE standard observer, the spectral intensity of Standard Illuminant A, and the spectral transmittance of the appropriate traffic signal filter (generally red, yellow, and green). This can be expressed mathematically as:

$$\tau_{sig} = \frac{\int_{380}^{780} \tau(\lambda)V(\lambda)S_A(\lambda)\tau_{sig}(\lambda)d\lambda}{\int_{380}^{780} V(\lambda)S_A(\lambda)\tau_{sig}(\lambda)d\lambda} = \frac{Y_{sig}}{\int_{380}^{780} V(\lambda)S_A(\lambda)\tau_{sig}(\lambda)d\lambda}$$

More information can be found in ANSI, American National Standard for Ophthalmics-Nonprescription Sunglass and Fashion Eyewear Requirements. Z80.3-2010. In one embodiment, the system has a red traffic signal transmittance greater than or equal to 8%, a yellow traffic signal transmittance greater than or equal to 6%, and a green traffic signal transmittance greater than or equal to 6%. These values are preferably as low as possible but may be as great as 100%.

Figure 11:
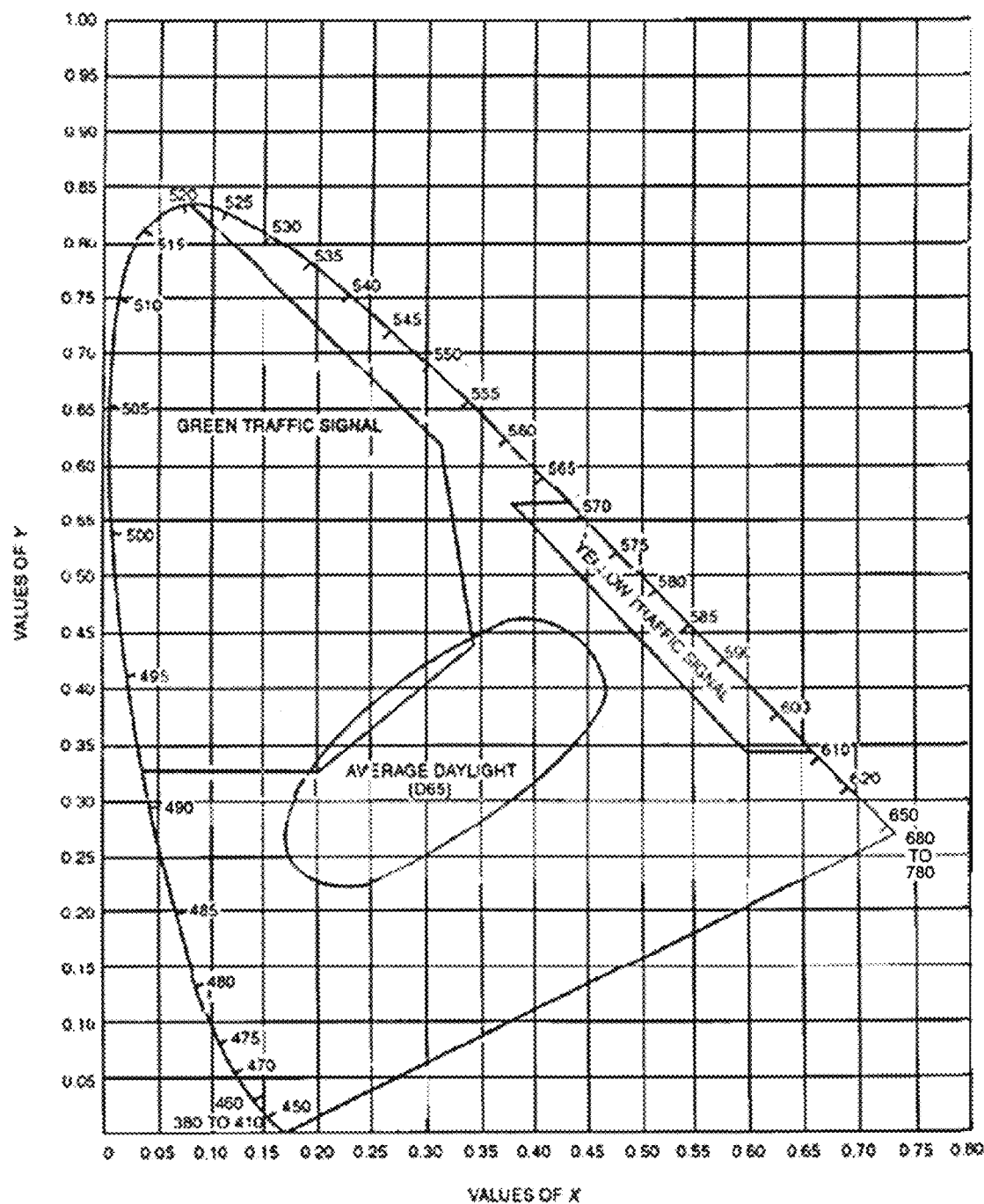
FIG. 11 shows the regions of acceptance for yellow and green traffic signals on a 1931 CIE diagram.

FIG. 11 indicates the regions of acceptance for the yellow and green traffic signals and average daylight as viewed through the lens for a general purpose lenses or shield, medium to dark lens. These regions of acceptance are further defined in Tables 3-5 below. Embodiments herein are configured to meet or exceed these standards.

TABLE 3

Corners of Yellow Region

| X | Y |
|---|---|
| .435 | .565 |
| .375 | .565 |
| .655 | .345 |
| .595 | .345 |

TABLE 4

Corners of Green Region

| X | Y |
|---|---|
| .038 | .330 |
| .205 | .330 |
| .345 | .440 |
| .313 | .620 |
| .080 | .835 |

TABLE 5

Points on the boundary of the average daylight (D65) region

| X | Y | X | Y |
|---|---|---|---|
| .455 | .43 | .180 | .290 |
| .465 | .410 | .185 | .310 |
| .465 | .390 | .200 | .330 |
| .455 | .370 | .215 | .350 |
| .425 | .340 | .234 | .370 |
| .410 | .325 | .255 | .390 |
| .385 | .305 | .280 | .410 |
| .360 | .290 | .310 | .430 |
| .330 | .270 | .325 | .440 |
| .295 | .250 | .350 | .450 |
| .250 | .230 | .365 | .455 |
| .225 | .225 | .395 | .480 |
| .200 | .230 | .425 | .455 |
| .180 | .250 | .440 | .445 |
| .175 | .270 | | |

Additionally, while these standards are discussed, embodiments disclosed herein may also meet other similar standards, such as those in the European Standard 1836: 2006.

In embodiments that are not configured to be used while driving, the systems do may not need to meet the characteristics discussed above.

As discussed above, characteristic of the transmission spectrum at and around the first wavelength at which the first local minimum occurs or the second wavelength at which the second local minimum occurs may be incorporated by using a selective light blocking element. This selective light blocking element may work through one of or a combination of absorption, interference, or reflection. Additionally, the selective blocking element may include more than one element, such as, for example, combination of one or more dyes in addition to one or more reflective layers. The selective light blocking element preferentially reduces light of the selected or blocked wavelengths but does not necessarily completely eliminate light of the blocked wavelengths.

Figure 8:
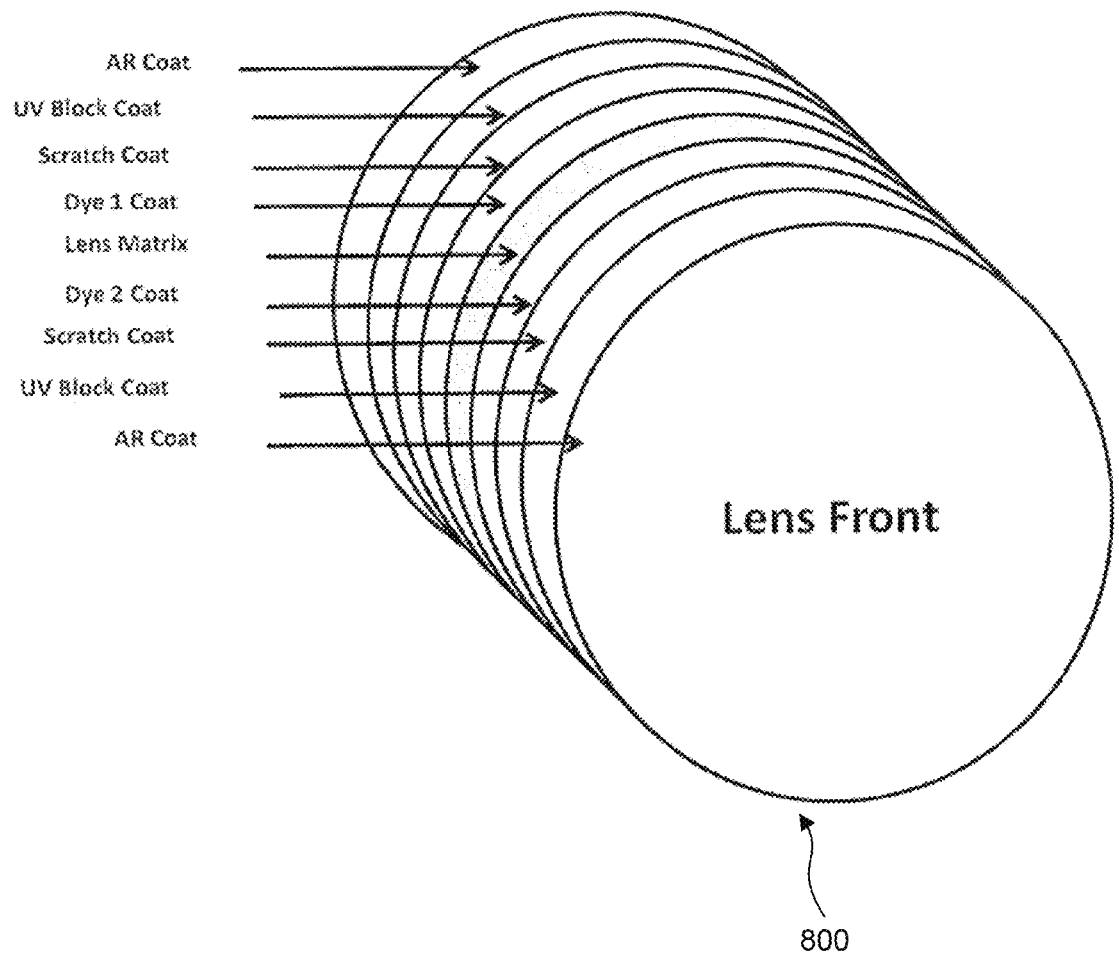
FIG. 8 shows ophthalmic lens having a combination of reflection and absorption coatings for selective blocking.
Figure 9:
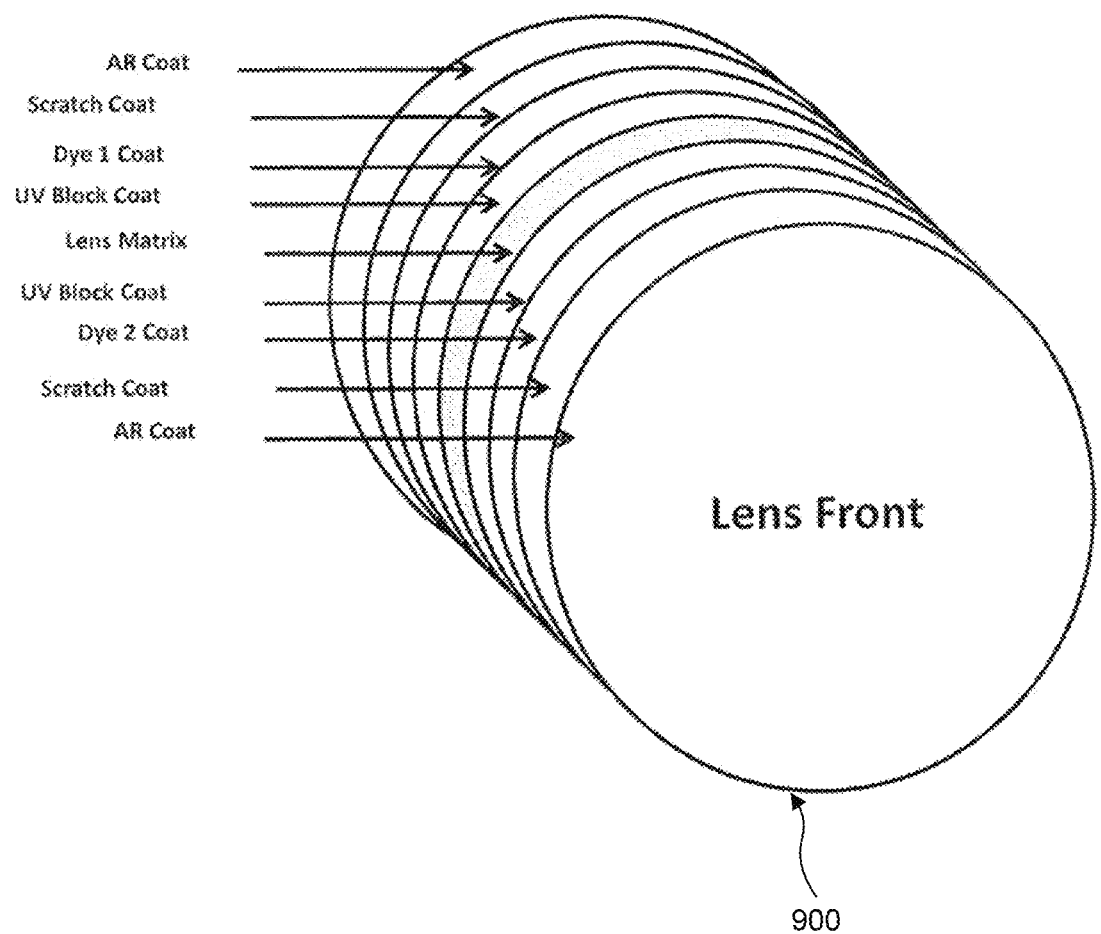
FIG. 9 shows an ophthalmic lens having a combination of reflection and absorption coatings for selective blocking.
Figure 10:
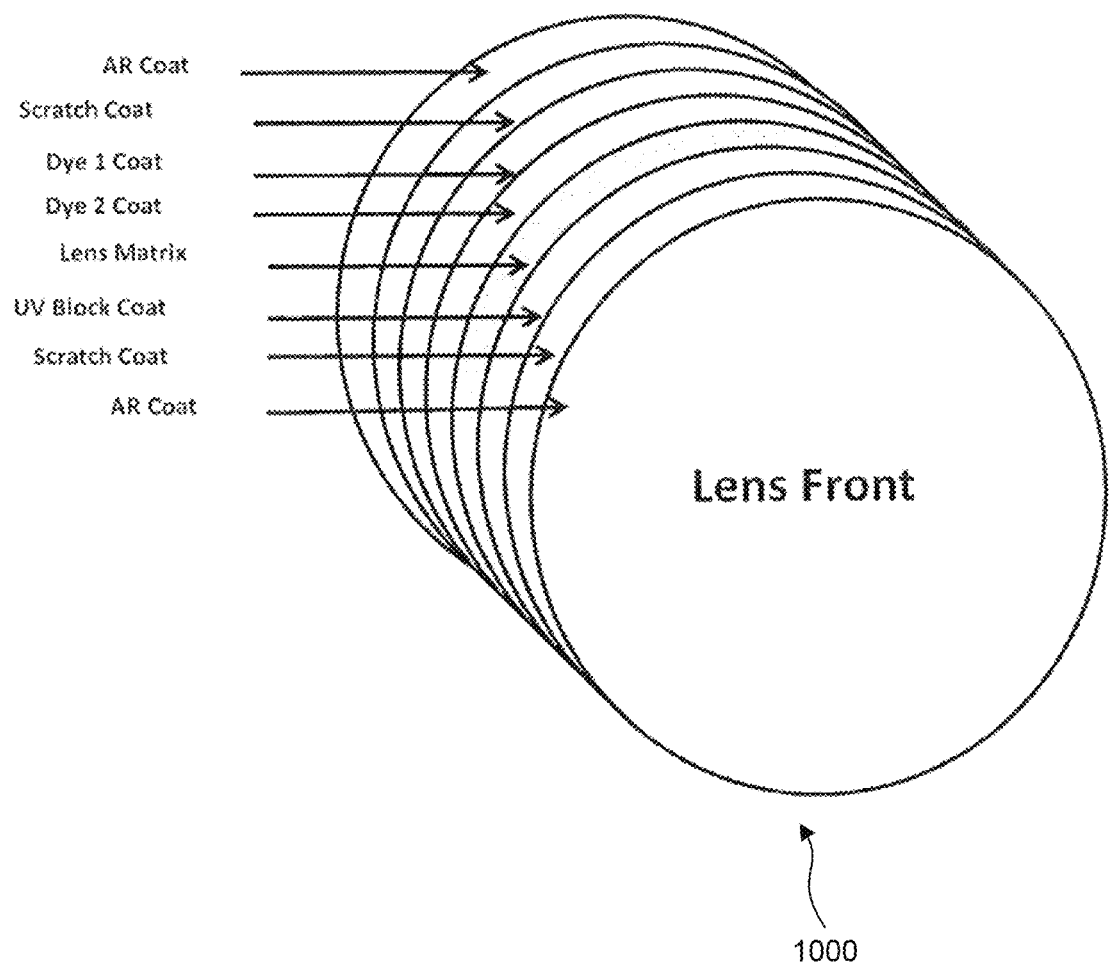
FIG. 10 shows an ophthalmic lens having a combination of reflection and absorption coatings for selective blocking.

This selective light blocking element may be one of a filter, a dye, or a dielectric mirror. For example, an ophthalmic lens may be dyed with a blue blocking tint, in a suitable proportion or concentration. The tinting may be accomplished, for example, by immersing the lens in a heated tint pot containing a blue blocking dye solution for some predetermined period of time. This is shown in FIG. 1, where the dye coats 105 and 104 are placed on the lens matrix 106 in the lens system. Additionally, as shown in FIGS. 8-10, the dyes can be located anywhere in relation to the lens matrix and other components of the system 100. In one embodiment, the selective light blocking element is one or more dyes selected or co-selected from: bilirubin; chlorophyll a, diethyl ether; chlorophyll a, methanol; chlorophyll b; diprotonated-tetraphenylporphyrin; hematin; magnesium octaethylporphyrin; magnesium octaethylporphyrin (MgOEP);

magnesium phthalocyanine (MgPc), PrOH; magnesium phthalocyanine (MgPc), pyridine; magnesium tetramesitylporphyrin (MgTMP); magnesium tetraphenylporphyrin (MgTPP); octaethylporphyrin; phthalocyanine (Pc); porphin; tetra-t-butylazaporphine; tetra-t-butylnaphthalocyanine; tetrakis(2,6-dichlorphenyl)porphyrin; tetrakis(o-aminophenyl)porphyrin; tetramesitylporphyrin (TMP); tetraphenylporphyrin (TPP); vitamin B12; zinc octaethylporphyrin (ZnOEP); zinc phthalocyanine (ZnPc), pyridine; zinc tetramesitylporphyrin (ZnTMP); zinc tetramesitylporphyrin radical cation; zinc tetrapheynlporphyrin (ZnTPP); Manganese(III) 5,10,15,20-tetra(4-pyridyl)-21H,23H-porphine chloride tetrakis(metho chloride)-10,15,20-Tetrakis (4-sulfonatophenyl)-21H,23H-porphine manganese(III) chloride, 2,3,7,8,12,13,17,18-Octaethyl-21H,23H-porphine manganese(III) chloride, Meso-tetra(N-methyl-4-pyridyl) porphine tetra chloride dihydrochloride, Meso-tetra(N-methyl-4-pyridyl)porphine tetra chloride dihydrochloride, Mn(III) meso-tetra(N-methyl-4-pyridyl)porphine pentachloride, Mn(III) meso-tetraphenylporphine chloride, palladium (II)-meso-tetra(4-fluorophenyl)tetrabenzoporphyrin (PdTPTBPF), palladium(II)-meso-tetraphenyltetranaphthoporphyrin (PdTPTNP), platinum(II)-meso-tetra(4-fluorophenyl)tetrabenzoporphyrin (PtTPTBPF), platinum(II)-meso-tetraphenyltetranaphthoporphyrin (PtTPTNP), zinc tetrakis(arylethynyl)porphyrins, perylene and derivatives thereof.

In one embodiment, the selective light blocking element is a porphyrin or derivative thereof. Additionally, in one embodiment, the selective light blocking element is a dye containing a Soret band.

According to another technique, the selective blocking element may be a filter. The filter could include, for example, organic or inorganic compounds exhibiting absorption and/or reflection of and/or interference with blue light wavelengths. The filter could comprise multiple thin layers or coatings of organic and/or inorganic substances. Each layer may have properties, which, either individually or in combination with other layers, absorbs, reflects or interferes with light having blue light wavelengths. Rugate notch filters are one example of blue blocking filters. Rugate filters are single thin films of inorganic dielectrics in which the refractive index oscillates continuously between high and low values. Fabricated by the co-deposition of two materials of different refractive index (e.g. $SiO_2$ and $TiO_2$), rugate filters are known to have very well defined stop-bands for wavelength blocking, with very little attenuation outside the band. The construction parameters of the filter (oscillation period, refractive index modulation, number of refractive index oscillations) determine the performance parameters of the filter (center of the stop-band, width of the stop band, transmission within the band).

Rugate filters are disclosed in more detail in, for example, U.S. Pat. Nos. 6,984,038 and 7,066,596, each of which is incorporated by reference in its entirety. Another technique is the use of multi-layer dielectric stacks. Multi-layer dielectric stacks are fabricated by depositing discrete layers of alternating high and low refractive index materials. Similarly to rugate filters, design parameters such as individual layer thickness, individual layer refractive index, and number of layer repetitions determine the performance parameters for multi-layer dielectric stacks.

The selective light blocking element has a transmission spectrum with a third local minimum in transmission at a third wavelength. The third wavelength is within 35 nm of 435 nm.

In one embodiment, the third wavelength at which the selective light blocking element has its third local minimum is different from the first wavelength (where the system has its first local minimum). These two wavelengths are related to one another but are generally not the same. In one embodiment, however, the third wavelength and the first wavelength are the same. This is generally so when the transmission spectrum of the underlying system without the selective light blocking element may be represented by a straight line.

The transmittance of the selective light blocking element is generally lower at the third wavelength then elsewhere. One way to characterize this is by comparing the transmittance of the selective light blocking element at the third wavelength with the transmittance of the selective light blocking element at other wavelengths. In one embodiment, the transmission spectrum of the light blocking element has an average transmission of at least 80% across the visible spectrum, preferably 85%, and more preferably 90%. The third local minimum, in comparison to the average transmission, is at least 10% below that average.

Another way to describe the characteristic of the transmission spectrum of the selective light blocking element near and at the third wavelength is by determining the slope of the transmission spectrum at wavelengths near the third wavelength. In one embodiment, for at least one point within 10 nm of the third wavelength on the positive side, the slope of the transmission spectrum of the system is at least 0.5% transmittance per nm. This slope may be infinite (a vertical line). However, in one preferred embodiment, the slope is most 4%. Additionally, in one embodiment, for at least one point within 10 nm of the first wavelength on the negative side, the slope of the transmission spectrum of the system is negative but has an absolute value of at least 0.5% transmittance per nm. This slope may be infinite (a vertical line). However, in one preferred embodiment, the slope is most 4%. A selective light blocking element with these slope ranges may have a relatively steep and quick transition to and from the lower transmittance value at the first wavelength.

Another way to characterize the transmission spectrum of the selective light blocking element at and near the third wavelength is by comparing two average transmission values. The first value is the average transmission of the selective light blocking element across a narrow wavelength range that includes the third wavelength. The second value is the average transmission of the selective light blocking element across wavelengths 400-470 nm excluding the wavelength range used to determine the first transmission value. The first value is 5 to 20% less than the second value.

The steps to determine this are as follows: (1) A first average transmission near the third wavelength is determined. This first average value is defined as the integral of the transmission spectrum of the selective light blocking element between "X" nm below the third wavelength to "X" nm above the third wavelength, divided by the two times the value of "X". In one embodiment, the value of "X" may be 5 nm, 10 nm, or 20 nm. (2) A second average transmission in the blue wavelength region is then determined. This wavelength region excludes the wavelength range used to calculate the first average transmission. The second average transmission may be determined by taking the integral of the transmission spectrum of the selective light blocking element between 400 and 470 nm and subtracting the integral of the transmission spectrum between "X" nm below the third wavelength to "X" nm above the third wavelength. The difference of these values is divided by the length in nm of the part of the transmission spectrum between 400 and 470 nm that excludes the wavelength range of "X" nm below the third wavelength to "X" nm above the third wavelength. As noted above, the first average transmission (1) is about 5 to 20% less than the second average transmission (2). Where X is 10 nm, the length in nm of the part of the transmission spectrum between 400 and 470 nm that excludes "X" nm below the first wavelength to "X" nm above the first wavelength is generally 50 nm, but may be greater if the first wavelength is within 10 nm of 400 nm or within 10 nm of 470 nm.

Another way to characterize the transmission spectrum of the selective light blocking element at and near the third wavelength is by comparing the transmission of the system comprising the selective light blocking element to a similar system without the selective light blocking element. In one embodiment, the value of the transmission spectrum of the system drops by at least 5% relative to the transmission spectrum of an otherwise similar system without the selective light blocking element. This range may be from 5% to 50%.

The transmission spectrum of the selective light blocking element may optionally have a fourth local minimum in transmission at a fourth wavelength in the range 400 nm-470 nm. As used herein, "first", "second", "third", and "fourth" are arbitrary naming conventions and are not meant to represent consecutive items. Thus, for example, a "third" wavelength and a "third" minimum may exist without the existence of a "second" wavelength and a "second" minimum.

The fourth wavelength may be at any wavelength within the wavelength range 400 nm-470 nm and is different from the third wavelength. In one embodiment, however, the third wavelength is within 15 nm of 435 nm and the fourth wavelength is within 15 nm of 455 nm. In one embodiment, additionally, the third and fourth wavelengths are within 10 nm of each other.

In relation to the second wavelength (of the system), the fourth wavelength and the second wavelength may or may not be the same wavelength. Generally, while they are related to each other, they are not the same. However, in one embodiment, the wavelengths are the same. This generally occurs when the transmission spectrum of the underlying system is straight.

Referring back to FIG. 1, system 100 may comprise other filters and layers. These include antireflective coats 109 and 101, scratch coats 107 and 103, and ultraviolet light (UV) filters 102 and 108. Thus, embodiments herein may optionally inhibit UV and infra-red light. Additionally, system 100 may also include at least one or a combination of an infrared filter, a photochromic dye, an anti-glare coating, an oleophobic coating, a self-cleaning coating, a self-healing coating, an anti-static film, an antimicrobial coating, a hydrophobic coating, a hardcoat primer coating, a film, or a polarizing film. Additionally, system 100 may include a color balancing component. FIG. 8, FIG. 9, and FIG. 10 shows systems 800, 900, and 1000 according to other embodiments, as already discussed above.

Embodiments herein also include non-ophthalmic systems. In one embodiment, instead of an ophthalmic lens, the system comprises a substrate. The non-ophthalmic system may be, by way of non-limiting example only: any type of windows (including building windows), automotive windshields, aircraft windows, camera flash bulbs and lenses, any type of artificial lighting fixture (either the fixture or the filament or both), fluorescent, lighting or any type of diffuser, medical instruments, surgical instruments, rifle scopes, binoculars, computer monitors, televisions screens, lighted signs or any other item or system whereby light is emitted or is transmitted or passes through filtered or unfiltered. For example, an architectural window in a high-rise building may include embodiments disclosed herein in cases where reduced overall light transmission is desirable so as to reduced unwanted bright light and/or glare on occupants of the building.

The non-ophthalmic system is in similar to system 100 in every way, except that that the average value of transmission of the system across the wavelength range 470 nm-700 nm may be lower transmission than average value of transmission of the system 100 in those wavelengths. Thus, the average value of the transmission spectrum of system across the wavelength range 470 nm-700 nm may between 0% and 70%, preferably between 20% and 70%, and more preferably between 5% and 70%. The preferable ranges for system 800 may be different from system 100 because system 800 may not be limited to certain standards for light transmittance. Additionally, the non-ophthalmic system may not need to meet the driving standards as discussed above. Additionally, the transmission spectrum of the system 800 at every wavelength across the wavelength range 470 nm-700 nm may lower than system 100. Thus, the transmission spectrum of system 800 at every wavelength across the wavelength range 470 nm-700 nm may be between 20% and 70%, preferably between 5% and 70%.

The non-ophthalmic system, like system 100, may also comprise a selective light blocking element that is similar to the selective blocking element described above.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

Further, references herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. The breadth and scope of the invention should not be limited by any of the above-described exemplary embodiments, but should be defined only in accordance with the following claims and their equivalents.

What is claimed is:

1. An ophthalmic system comprising:
an ophthalmic lens having a selective light blocking element, wherein the selective light blocking element includes porphyrin or a porphyrin derivative, and wherein:
the transmission value of every wavelength across the wavelength range 400 nm to 470 nm of a transmission spectrum of the system is between 5% and 30%;
the average transmission value of the transmission spectrum of the system across the wavelength range 470 nm-700 nm is between 20% and 70%;
the transmission spectrum of the system between 380 nm and 700 nm has a first local minimum in transmission at a first wavelength in the wavelength range 400 nm-470 nm and a second local minimum in transmission at a second wavelength in the range 400 nm-470 nm, different from the first wavelength; and
the transmission spectrum of the system is characterized by having a red traffic signal transmittance greater than or equal to 8%, a yellow traffic signal transmittance greater than or equal to 6%, and a green traffic signal transmittance greater than or equal to 6%, each of the signal transmittances calculated according to the American National Standards.

2. The system of claim 1, wherein for at least one point within 10 nm of the first wavelength on the positive side, the slope of the transmission spectrum of the system is at least 0.005 transmittance per nm.

3. The system of claim 1, wherein for at least one point within 10 nm of the first wavelength on the negative side, the slope of the transmission spectrum of the system is negative and has an absolute value of at least 0.005 transmittance per nm.

4. The system of claim 1, wherein the first wavelength is within the range 425 nm to 445 nm.

5. The system of claim 1,
wherein the transmission spectrum of the system has:
a first average transmission near the first wavelength defined as the integral of the transmission spectrum between 10 nm below the first wavelength to 10 nm above the first wavelength, divided by 20 nm;
a second average transmission in the blue region excluding wavelength range used to calculate the first average transmission;
wherein the second average transmission is defined as the integral of the transmission spectrum between 400 nm and 470 nm minus the integral of the transmission spectrum between 10 nm below the first wavelength to 10 nm above the first wavelength, divided by the length in nm of the part of the transmission spectrum between 400 nm and 470 nm that excludes 10 nm below the first wavelength to 10 nm above the first wavelength;
wherein the first average transmission is 5 to 20% less than the second average transmission.

6. The system of claim 1, wherein the transmission spectrum of the system further comprises at least one inflection point at a wavelength lower than the first wavelength.

7. The system of claim 1, wherein the system has a luminous transmittance greater than or equal to 8%.

8. An ophthalmic system comprising:
an ophthalmic lens having a selective light blocking element, wherein the selective light blocking element includes porphyrin or a porphyrin derivative, and wherein:
the transmission value of every wavelength across the wavelength range 400 nm to 470 nm of a transmission spectrum of the system is between 5% and 30%;
the average transmission value of the transmission spectrum of the system across the wavelength range 470 nm-700 nm is between 20% and 70%;
the transmission spectrum of the system between 380 nm and 700 nm has a first local minimum in transmission at a first wavelength in the wavelength range 400 nm-470 nm;
a transmission spectrum of the selective light blocking element between 380 nm and 700 nm has a second local minimum in transmission at a second wavelength wherein the second wavelength is within 35 nm of 435 nm; and
the transmission spectrum of the system is characterized by having a red traffic signal transmittance greater than or equal to 8%, a yellow traffic signal transmittance greater than or equal to 6%, and a green traffic signal transmittance greater than or equal to 6%, each of the signal transmittances calculated according to the American National Standards.

9. The system of claim 8, wherein the transmission spectrum of the selective light blocking element between 380 nm and 700 nm has a second third local minimum in transmission at a third wavelength in the range 400 nm-470 nm, different from the second wavelength.

10. The system of claim 8,
wherein the transmission spectrum of the selective light blocking element has:
a first average transmission near the second wavelength defined as the integral of the transmission spectrum of the selective light blocking element between 10 nm below the second wavelength to 10 nm above the second wavelength, divided by 20 nm;
a second average transmission in the blue region excluding wavelength range used to calculate the first average transmission;
wherein the second average transmission is defined as the integral of the transmission spectrum of the light blocking element between 400 nm and 470 nm minus the integral of the transmission spectrum between 10 nm below the second wavelength to 10 nm above the second wavelength, divided by the length in nm of the part of the transmission spectrum of the light blocking element between 400 nm and 470 nm that excludes 10 nm below the second wavelength to 10 nm above the second wavelength;

wherein the first average transmission is 5 to 20% less than the second average transmission.

11. The system of claim 8, wherein the value of the transmission spectrum of the system drops by at least 5% relative to an otherwise equivalent system without the selective light blocking element at the second wavelength.

12. The system of claim 1, wherein the selective light blocking element further includes a dielectric mirror.

13. The system of claim 1, wherein the system comprises at least one of or a combination of a UV blocking component, an optional IR blocking component, an anti-glare coating, an anti-reflective coating, an oleophobic coating, a self-cleaning coating, a self-healing coating, an anti-static film, an antimicrobial coating, or a scratch-resistant coating.

14. A system comprising:
   a substrate having a selective light blocking element, wherein the selective light blocking element includes porphyrin or a porphyrin derivative,
   wherein:
   the transmission spectrum of the system at every wavelength across the wavelength range 400 nm to 470 nm is between 5% and 30%;
   the average transmission value of the transmission spectrum of the system across the wavelength range 470 nm-700 nm is between 20% and 70%;
   the transmission spectrum of the system between 380 nm and 700 nm has a first local minimum in transmission at a first wavelength in the wavelength range 400 nm-470 nm and a second local minimum in transmission at a second wavelength in the range 400 nm-470 nm, different from the first wavelength; and
   the transmission spectrum of the system is characterized by having a red traffic signal transmittance greater than or equal to 8%, a yellow traffic signal transmittance greater than or equal to 6%, and a green traffic signal transmittance greater than or equal to 6%, each of the signal transmittances calculated according to the American National Standards.

15. An ophthalmic system comprising:
   an ophthalmic lens having a selective light blocking element, wherein:
   the transmission value of every wavelength across the wavelength range 400 nm to 470 nm of a transmission spectrum of the system is between 5% and 30%;
   the average transmission value of the transmission spectrum of the system across the wavelength range 470 nm-700 nm is between 20% and 70%;
   the transmission spectrum of the system between 380 nm and 700 nm has a first local minimum in transmission at a first wavelength in the wavelength range 400 nm-470 nm and a second local minimum in transmission at a second wavelength in the range 400 nm-470 nm, different from the first wavelength; and
   the transmission spectrum of the system is characterized by having a red traffic signal transmittance greater than or equal to 8%, a yellow traffic signal transmittance greater than or equal to 6%, and a green traffic signal transmittance greater than or equal to 6%, each of the signal transmittances calculated according to the American National Standards.

16. The ophthalmic system of claim 15, wherein the selective light blocking element is a dye.

* * * * *